United States Patent
Rodrigues

(10) Patent No.: US 11,461,311 B2
(45) Date of Patent: Oct. 4, 2022

(54) BOT EXTENSIBILITY INFRASTRUCTURE

(71) Applicant: Oracle International Corporation, Redwood Shores, CA (US)

(72) Inventor: Eduardo Ribeiro Rodrigues, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 98 days.

(21) Appl. No.: 16/827,191

(22) Filed: Mar. 23, 2020

(65) Prior Publication Data

US 2020/0341970 A1 Oct. 29, 2020

Related U.S. Application Data

(60) Provisional application No. 62/839,585, filed on Apr. 26, 2019.

(51) Int. Cl.
*G06F 16/00* (2019.01)
*G06F 16/23* (2019.01)
*H04L 51/02* (2022.01)
*G06F 16/21* (2019.01)

(52) U.S. Cl.
CPC ........ *G06F 16/2379* (2019.01); *G06F 16/219* (2019.01); *H04L 51/02* (2013.01)

(58) Field of Classification Search
CPC ....... H04L 51/20; H04L 51/02; G06F 16/219; G06F 16/2379
See application file for complete search history.

(56) References Cited

U.S. PATENT DOCUMENTS

| | | | |
|---|---|---|---|
| 10,721,189 B1* | 7/2020 | Gau | H04L 51/32 |
| 2014/0201378 A1* | 7/2014 | Elliott | A63F 13/30 |
| | | | 709/227 |
| 2016/0139908 A1* | 5/2016 | Griffith | G06F 3/065 |
| | | | 717/177 |
| 2017/0032050 A1* | 2/2017 | Kol | G06F 16/986 |
| 2017/0180284 A1* | 6/2017 | Smullen | H04L 69/14 |
| 2018/0107461 A1* | 4/2018 | Balasubramanian | G06F 8/34 |
| 2019/0065465 A1* | 2/2019 | Cristian | G06F 11/3688 |
| 2019/0066694 A1* | 2/2019 | Hirzel | G10L 17/22 |
| 2019/0073197 A1* | 3/2019 | Collins | G06F 3/0481 |
| 2019/0124020 A1* | 4/2019 | Bobbarjung | G06Q 20/123 |
| 2019/0132264 A1* | 5/2019 | Jafar Ali | G06F 40/30 |
| 2019/0251198 A1* | 8/2019 | Shamsutdinov | G06F 21/602 |

\* cited by examiner

*Primary Examiner* — Shiow-Jy Fan
(74) *Attorney, Agent, or Firm* — Kilpatrick Townsend & Stockton LLP

(57) ABSTRACT

The present disclosure relates generally to techniques for extending or customizing base skills (e.g., chatbots). According to certain embodiments, a bot extension infrastructure is provided to facilitate customization and/or extension of base skills, separately tracking different versions of the base skills and the extensions, applying an extension to different versions of a base skill, or applying different versions of extensions to a same base skill. The extensions to the base skills include JSON extensions indicating modifications to metadata of the base skills. A base skill (e.g., downloaded from a skills store) can be extended or customized by applying a JSON extension that describes the changes to be made to the metadata of the base skill.

18 Claims, 29 Drawing Sheets

Create Extended Skill

*Base Skill
AgentBot 1.0

*Display Name

*Name

*Version

One-Sentence Description

Create

≡ ORACLE Product name ⌄

Skills/ AgentBots ⊙/Intents

INSTANT APPS | VALIDATE | △TRAIN checkin — 1110
Intent 2
Intent 3
Intent 4
Intent 5
Intent 6 checkin

Description

Name
checkin

Description ⓢ ▴
extended value for 'checkin' intent

Examples
*Filter*
*Enter your example utterances here*
back
checking in
hello

Original value entry point only showing on hover

Create Service

**\* Name**  |Service name|

Description  |Optional short description for this service|

○ Embedded Container  ○ Oracle Mobile Cloud  ⦿ External

⓪ **\* Metadata URL**  |http://test.com/services|

**\* User Name**  |someone@company.com|

**\* Password**  |Password for user|

▲ Optional HTTP Headers  ⓪

[Create]

FIG. 23

BOT EXTENSIBILITY INFRASTRUCTURE

CROSS-REFERENCE TO RELATED APPLICATION

This patent application claims benefit of and priority to U.S. Provisional Patent Application Ser. No. 62/839,585, filed Apr. 26, 2019, entitled "Bot Extensibility Infrastructure," which is assigned to the assignee hereof and is hereby incorporated by reference in its entirety for all purposes.

COPYRIGHT

A portion of the disclosure of this patent application contains material which is subject to copyright protection. The copyright owner has no objection to the facsimile reproduction by anyone of the patent application or the patent disclosure, as it appears in the Patent and Trademark Office patent file or records, but otherwise reserves all copyright rights whatsoever.

BACKGROUND

Many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots (also referred to hereinafter as "bots" or "skills") have thus begun to be developed to engage in conversations with end users, especially over the Internet. End users or customers can communicate with bots through messaging applications that the end users have already installed and used. An intelligent bot, generally powered by artificial intelligence (AI), can communicate more intelligently and contextually in live conversations, and thus may allow for a more natural conversation between the bot and the end users for improved conversational experience. Rather than the end user learning a fixed set of keywords or commands that the bot knows how to respond to, an intelligent bot may be able to understand the end user's intention based upon user utterances in natural language and respond accordingly.

However, chatbots are difficult to build because these automated solutions require specific knowledge in certain fields and the application of certain techniques that may be solely within the capabilities of specialized developers. As part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique(s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions.

As a result, building an appropriate chatbot can be very complex and time consuming, and developers may play a central role in building such solutions. However, the number of developers with the requisite skillset to build such chatbots is very limited. Many times the developer also has to become an expert in a specific domain corresponding to the problem being solved, such as a business analyst. The population of such developers who are also domain experts is extremely limited. This results in many organizations or individuals being unable to develop AI or ML-based chatbots due to the lack of availability of such expert developers. This makes AI or ML-based chatbot solutions expensive and/or inaccessible to many individuals and organizations.

SUMMARY

Techniques disclosed herein relate generally to chatbots. More specifically and without limitation, techniques disclosed herein relate to an infrastructure for extending a base chatbot that may be developed by another party and available in a chatbot store where different chatbots and/or different versions of a chatbot may be stored for downloading. Various inventive embodiments are described herein, including methods, systems, non-transitory computer-readable storage media storing programs, code, or instructions executable by one or more processors, and the like.

According to some embodiments, a computer-implemented method may include obtaining metadata associated with a base application (e.g., a base bot), modifying the metadata associated with the base application to generate an extended application (e.g., an extended bot), determining differences between the extended application and the base application, and storing the differences between the extended application and the base application as a JavaScript Object Notation (JSON) file in a database. The JSON file in the database may be referred to as a bot extension (or a skill extension), and may be downloaded to implement the extended application by modifying the base application according to the JSON file.

In certain embodiments, a computer-implemented method may include obtaining a base application that includes implementation data and a first JSON file including metadata associated with the base application, and obtaining a second JSON file associated with an extended application of the base application. The second JSON file describes changes to be made to the first JSON file and is referred to as a bot extension or skill extension. The computer-implemented method may further include making the changes described in the second JSON file to the first JSON file to generate metadata associated with the extended application. The extended application may then be implemented based on the implementation data of the base application and the metadata associated with the first JSON file as modified based upon the second JSON file.

According to certain embodiments, a computer-implemented method may include obtaining, from a database storing metadata in JavaScript Object Notation (JSON) files for a plurality of applications, a first JSON file including metadata for a first application; receiving a modification to the first application to generate an extended application; determining a difference between metadata for the extended application and the metadata for the first application; and storing, in the database, a second JSON file describing changes to be made to the metadata for the first application to generate the metadata for the extended application.

In some embodiments, the plurality of applications may be chatbot applications. The JSON files for the plurality of applications may be stored as compressed files in the database. In some embodiments, the plurality of applications may include two or more versions of the first application. In some embodiments, the second JSON file may be compatible with two or more versions of the first application for extending the two or more versions of the first application. In some embodiments, the second JSON file may be incompatible with at least one version in the two or more versions of the first application, and the database may include a third JSON file that is compatible with the at least one version in the two or more versions of the first application, where the second JSON file and the third JSON file may have different version numbers.

In some embodiments, the metadata for the first application may include metadata for at least one of configuring, training, testing, or executing the first application. In some embodiments, the metadata for the first application may include metadata for at least one of an intent, an entity, an utterance, a custom component, or a conversation flow of the first application. The second JSON file may include metadata for a custom component in the extended application. In some embodiments, modifying the first application to generate the extended application may include modifying the first application through a representational state transfer application programming interface (REST API).

According to certain embodiments, a computer-implemented method may include obtaining a first application from a database storing a plurality of applications, where the first application may include implementation data for the first application and a first JavaScript Object Notation (JSON) file including metadata associated with the first application. The computer-implemented method may also include obtaining, from the database, a second JSON file associated with an extended application of the first application, where the second JSON file describes changes to the first JSON file. The computer-implemented method may further include applying the changes to the first JSON file described in the second JSON file to generate metadata associated with the extended application, and implementing the extended application based on the implementation data for the first application and the metadata associated with the extended application.

In some embodiments, the plurality of applications and the extended application may be chatbot applications. The metadata associated with the first application may include metadata for at least one of configuring, training, testing, or executing the first application. The metadata associated with the first application may include metadata for at least one of an intent, an entity, an utterance, a custom component, or a conversation flow of the first application. Applying the changes to the first JSON file described in the second JSON file may include determining that the second JSON file conflicts with the first JSON file, and resolving one or more conflicts between the second JSON file and the first JSON file.

In some embodiments, the computer-implemented method may further include obtaining a third JSON file describing changes to the metadata associated with the extended application from the database, applying the changes to the metadata associated with the extended application described in the third JSON file to generate metadata associated with a second extended application, and implementing the second extended application based on the implementation data of the first application and the metadata associated with the second extended application. In some embodiments, the computer-implemented method may further include obtaining from the database a second application that may include implementation data for the second application and a third JSON file including metadata associated with the second application, applying the changes to the first JSON file described in the second JSON file to the third JSON file to generate metadata associated with a second extended application, and implementing the second extended application based on the implementation data for the second application and the metadata associated with the second extended application. In some embodiments, the database may include a first repository storing implementation data of the plurality of applications, and a second repository storing the first JSON file and the second JSON file.

According to certain embodiments, a non-transitory computer-readable storage medium may store computer-executable instructions that, when executed by one or more processors of a computing system, causing the one or more processors to perform operations. The operations may include obtaining, from a database storing metadata in JavaScript Object Notation (JSON) files for a plurality of applications, a first JSON file including metadata for a first application, receiving a modification to the first application to generate an extended application, determining a difference between metadata for the extended application and the metadata for the first application, and storing, in the database, a second JSON file describing changes to be made to the metadata for the first application to generate the metadata for the extended application.

According to certain embodiments, a computer system may include one or more processors and a non-transitory computer-readable storage medium storing computer-executable instructions. The instructions, when executed by the one or more processors, may cause the one or more processors to perform operations that may include obtaining, from a database storing a plurality of applications, a first application that may include implementation data for the first application and a first JavaScript Object Notation (JSON) file including metadata associated with the first application. The operations may also include obtaining, from the database, a second JSON file associated with an extended application of the first application, where the second JSON file describes changes to the first JSON file. The operations may further include applying the changes to the first JSON file described in the second JSON file to generate metadata associated with the extended application, and implementing the extended application based on the implementation data for the first application and the metadata associated with the extended application.

Techniques and infrastructures disclosed herein may also allow clients to obtain, on demand, a representation of the differences between an extended application and a corresponding base application. In some embodiments, the metadata associated with an extended application and stored in the JSON file of a bot extension may include the definition of a test suite that may be used by the infrastructure to validate the extended application when needed. In some embodiments, separate versioning may be used for the bot extension and the base application, such that the base application and the bot extension may evolve separately. The metadata for a version of a bot extension stored in the JSON file may indicate the range of versions of the base application that may be compatible with the version of the bot extension. Thus, in some embodiments, a bot extension may be rebased to different versions of a same base application.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Illustrative examples are described in detail below with reference to the following figures.

FIG. 9 illustrates an example of a dialog in a GUI image for creating an extended skill according to certain embodiments.

FIG. 11 illustrates an example of a GUI image showing form fields that can be added, edited, or removed for extending a skill according to certain embodiments.

FIG. 14 illustrates an example of a GUI image showing comparison results between a base skill and an extended skill according to certain embodiments.

FIG. 15 illustrates an example of a GUI image showing a dialog for rebasing a skill extension to a different version of a base skill according to certain embodiments.

FIG. 23 illustrates an example of a GUI image for creating a new service in a skill according to certain embodiments.

DETAILED DESCRIPTION

Figure 1:
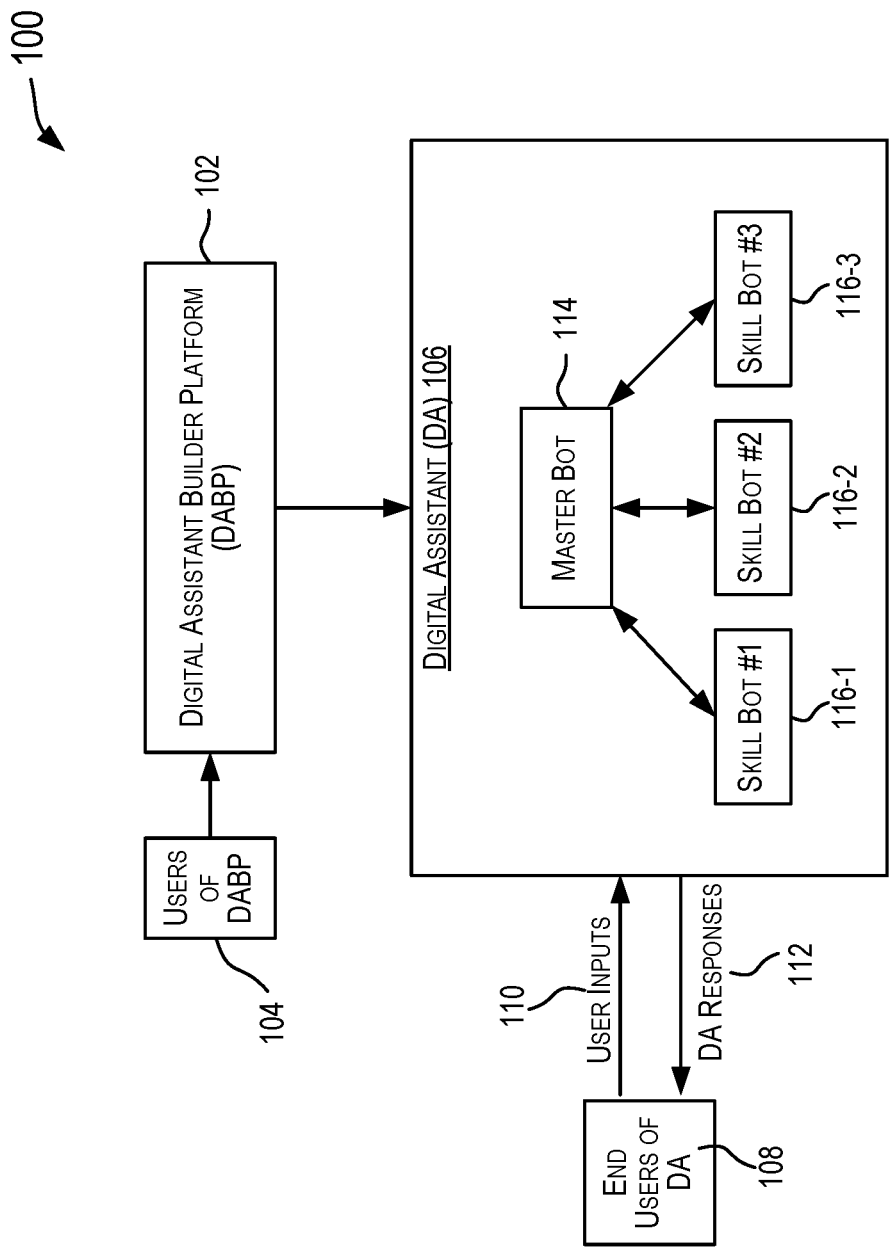
FIG. 1 is a simplified block diagram of a distributed environment incorporating an exemplary embodiment.

The present disclosure relates generally to chatbots. More specifically and without limitation, techniques disclosed herein relate to an infrastructure for extending base chatbots that may be developed by another party and available for downloading in a chatbot store where different chatbots and/or different versions of a chatbot may be stored. Various inventive embodiments are described herein, including methods, systems, non-transitory computer-readable storage media storing programs, code, or instructions executable by one or more processors, and the like.

Enterprises may want to create chatbot systems for various purposes. A chatbot system may include one or more user intent classification engines for identifying end user intents based on user utterances, and one or more dialog engines for intelligently and contextually composing messages to respond to user utterances according to the determined end user intents. However, it is a challenging task to build the chatbot system, including both the user intent classification engines that can determine the end users' intents based upon user utterances and the dialog engines for intelligently and contextually generating responses, in part due to the subtleties and ambiguity of natural languages and the dimension of the input space (e.g., possible user utterances) and the size of the output space (number of intents). The population of bot developers who are also domain experts is extremely limited. This makes AI or ML-based chatbot solutions expensive and/or inaccessible to many individuals and organizations who want to use a bot to communicate or otherwise interact with end users or customers.

According to some embodiments, chatbots for various domains or applications may be built by developers with the requisite skills and made available to enterprises or individuals. The chatbots may be made available at a chatbot store that may allow developers and partners to publish chatbots and may allow customers to download the chatbot to implement customized chatbots. The chatbot store may have certain functionality, such as notifications, auto updates, version control, and the like.

According to some embodiments, a bot extension infrastructure may be provided such that customers may customize and/or extend chatbots downloaded from the chatbot store in order to adjust them to specific features, processes, terminology, culture, etc., that may be appropriate for their specific applications. The bot extensibility infrastructure may facilitate the extensibility of chatbots in a holistic, generic, flexible, safe and maintainable way. For example, in some embodiments, a base chatbot downloaded from the chatbot store may be extended or customized by applying an extension (e.g., described in a JavaScript Object Notation (JSON) file) that makes changes to the base chatbot. The base chatbots and the extensions may be tracked separately. In some embodiments, an extension may be applied to different versions of a base chatbot. In some embodiments, an extension may be rebased to a different version of a base chatbot.

As used herein, a "chatbot," "bot," "skill," or "skill bot" may refer to a computer program designed to simulate conversation with human end users, especially over the Internet. Individual skills may be designed to interact with end users and fulfill specific types of tasks, such as ordering food, making reservations, changing contact information, technical support, and customer service. Each skill may help an end user complete a task through a combination of visual, audio, or text messages and UI elements such as buttons, tables, lists, or the like.

As used herein, a "base bot" or "base skill" may refer to a bot developed by a Software as a Service (SaaS) provider or developers with the requisite skills and made available to enterprises or individuals for implementing a custom bot. A base bot may be available for download from a bot store (also referred to as a skills store) and may be customized and/or extended. An "extended bot" or "extended skill" may refer to a bot customized and/or extended (e.g., expanded or enhanced) from a base bot in order to adjust the base bot to specific features, processes, terminology, culture, and the like. A "bot extension," "skill extension," or "extension" may refer to the code and/or data that can be used to extend a base bot into an extended bot.

As used herein, the term "intents" may refer to categories of actions or tasks that end users expect a skill to perform for them. The term "entities" may refer to variables that identify, from user inputs, information that enables the skill to fulfill a task. The term "components" may refer to various functions that a skill may use to respond to end users, such as outputting text, returning information from a backend, and performing custom logic. The term "dialog flow" may refer to the definition of a skill-user interaction and may describe how a skill responds and behaves according to user inputs. The term "channels" may refer to platform-specific configurations to allow the skills to access messaging platforms or client messaging apps. A single skill may have several channels configured for it such that it can simultaneously run on different services or platforms that the end users may prefer to use.

As used herein, an "utterance" or a "message" may refer to one or more sentences exchanged during a conversation, where a conversation may refer to a communication session that may include one or more utterances or messages. A conversation may include one or more stages or states. A conversation flow may be an abstraction of multiple conversations that include the same stages or states and the same transitions from stage (or state) to stage (or state). Each conversation may be a specific instance of a corresponding conversation flow. A state (or stage) of a conversation (or conversation flow) may be associated with a state of a state machine maintained by a bot system for conducting conversations with other bot systems or persons. In some cases, a state may correspond to an intent or goal of an end user. As used herein, an end user may refer to an end user of a bot system, such as a person or another entity that engages in a conversation with a bot system through a messaging application or platform. For example, an end user may be a customer or a client of an enterprise that owns the bot system. As used herein, a user of a bot system may refer to an owner, an operator, an administrator, or a developer of the bot system.

In the following description, for the purposes of explanation, specific details are set forth in order to provide a thorough understanding of examples of the disclosure. However, it will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The word "example" or "exemplary" is used herein to mean "serving as an example, instance, or illustration." Any embodiment or design described herein as "exemplary" or "example" is not necessarily to be construed as preferred or advantageous over other embodiments or designs.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks. Systems depicted in some of the figures may be provided in various configurations. In some examples, the systems may be configured as a distributed system where one or more components of the system are distributed across one or more networks in a cloud computing system. Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

I. Skills

FIG. 1 is a simplified block diagram of a distributed environment 100 incorporating an exemplary embodiment. Distributed environment 100 includes a digital assistant builder platform (DABP) 102 that enables enterprises to create and deploy digital assistants for their end users. DABP 102 can be used to create one or more digital assistants (DAs). DABP 102 can be used by multiple enterprises to create digital assistants for their end users. For example, as shown in FIG. 1, a user 104 representing a particular enterprise can use DABP 102 to create and deploy a digital assistant 106 for end users of the particular enterprise. For example, a restaurant (e.g., a pizza shop) may use DABP 102 to create and deploy a digital assistant that enables customers of the restaurant to order food (e.g., order pizza).

For purposes of this disclosure, a "digital assistant" refers to an entity that helps end users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system.

For example, as shown in FIG. 1, end users 108 may use digital assistant 106 to perform various tasks via natural language-based conversations with digital assistant 106. As part of a conversation, a user may provide one or more user inputs 110 and get responses 112 back from digital assistant 106. Via these conversations, a user can request one or more tasks to be performed by the digital assistant and, in response, the digital assistant may perform the user-requested tasks and respond with appropriate responses to the user.

User inputs 110 may be in a natural language and may be referred to as utterances. A user utterance can be in text form (e.g., when the user types something as input to digital assistant 106) or in audio input or speech form (e.g., when the user says something as input to digital assistant 106). The utterances are typically in a language spoken by end user 108. When a user input is in speech form, the user input may be converted to text utterances in that particular language and the text utterances are then processed by digital assistant 106. Various speech-to-text processing techniques may be used to convert a speech or audio input to a text utterance, which is then processed by digital assistant 106.

A text utterance, input by the user or generated by converting speech input to text form, can be a text fragment, a sentence, multiple sentences, and the like. Digital assistant 106 is configured to apply natural language understanding (NLU) techniques to the text utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents.

For example, the user input may request a pizza to be ordered, for example, "I want to order a pizza." Digital assistant 106 is configured to understand the meaning of the utterance and take appropriate actions that may involve responding to the end user with questions requesting user input on the type of pizza the end user desires to order, the size of the pizza, any toppings for the pizza, and the like. The responses provided by digital assistant 106 may also be in the form of natural language, which may involve natural language generation (NLG) processing performed by digital assistant 106. Once digital assistant 106 has the requisite information from the user, digital assistant 106 may then cause a pizza to be ordered. Digital assistant 106 may end the conversation with the end user by outputting information indicating that the pizza has been ordered.

In certain embodiments, an utterance received as input by digital assistant 106 goes through a series or pipeline of processing steps. These steps may include, for example, parsing the utterance, understanding the meaning of the utterance, refining and reforming the utterance to develop a better understandable structure for the utterance, determining an action to be performed in response to the utterance, causing the action to be performed, generating a response to be output to the end user responsive to the user utterance, outputting the response to the end user, and the like.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, etc.). In certain embodiments, the NLU processing or portions thereof may be performed by digital assistant 106 itself. In some other embodiments, digital assistant 106 may use other resources to perform portions of the NLU processing. For example, the syntax and structure of a sentence may be identified by processing the sentence using a parser, a part-of-speech tagger, and/or a named entity recognizer. In one implementation, for the English language, a parser, a part-of-speech tagger, and a named entity recognizer provided by the Stanford Natural Language Processing (NLP) Group is used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. In certain embodiments, digital assistant 106 provides subsystems (e.g., components implementing NLU functionality) that are configured for processing different languages. These subsystems may be implemented as pluggable units that can be called using service calls from an NLU core server. This makes the NLU processing flexible and extensible for each language, including allowing different orders of processing. A language pack may be provided for each respective language, where the language pack can register a list of subsystems that can be served from the NLU core server, and can also take advantage of the generic subsystems provided, if needed.

A digital assistant, such as digital assistant 106, can be made available to its end users through a variety of different channels, such as, but not limited to, via certain applications (also referred to as apps), via social media platforms, via various messaging services and applications, and other applications or channels. A single digital assistant can have several channels configured for it so that it can be run on and accessed by different services simultaneously.

A digital assistant contains or is associated with one or more skills. In certain embodiments, these skills are individual chatbots that are designed to interact with end users and fulfill specific types of tasks, such as tracking inventory, submitting timecards, creating expense reports, ordering food, checking a bank account, making reservations, buying a widget, and the like. For example, for the embodiment depicted in FIG. 1, digital assistant 106 includes skill bots 116-1, 116-2, 116-3, and so on. As described above, the terms "skill" and "skills" are used synonymously with the terms "skill bot" and "skill bots," respectively, in this disclosure.

Each skill bot associated with a digital assistant helps an end user of the digital assistant complete a task through a conversation with the end user, where the conversation can include a combination of text or audio inputs provided by the end user and responses provided by the skill bot. These responses may be in the form of text or audio messages to the end user and/or using simple user interface elements (e.g., select lists) that are presented to the end user for the end user to make selections.

There are various ways in which a skill or skill bot can be added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as the "skills store") that offers multiple skills directed to a wide range of tasks. The skills offered through the skills store may expose various cloud services. A user of DABP 102 can access the skills store via DABP 102, select a desired skill, and add the selected skill to a digital assistant created using DABP 102. A skill from the skills store can be added to a digital assistant as is or in a modified form. For example, a user of DABP 102 may select and clone a particular skill bot provided by the skills store, make customizations or modifications to the selected skill bot, and then add the modified skill bot to a digital assistant created using DABP 102.

In certain embodiments, a digital assistant created and deployed using DABP 102 is implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, 116-3, and the like that are child bots of master bot 114. In certain embodiments, digital assistant 106 itself acts as the master bot.

A digital assistant implemented according to the master-child bot architecture enables end users of the digital assistant to interact with multiple skills through a unified user interface. When an end user engages with a digital assistant, the user input is received by the master bot, which then processes the user input to identify a user request. Based upon the processing, the master bot determines whether the user request can be handled by the master bot itself. If it is determined that the user request may not be handled by the master bot, the master bot selects an appropriate skill bot for handling the user request and routes the conversation to the selected skill bot. This enables an end user to, through a common single interface, converse with and use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, and the like. In this way, the end user or consumer of the digital assistant need only know how to access the digital assistant.

In a master bot/child bots infrastructure, the master bot is configured to be aware of the list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to identify or predict a specific skill bot, from the multiple available skill bots, that can best serve or handle the user request. The master bot then routes the utterance (or a portion of the utterance) to that specific skill bot for further handling. Control thus flows from the master bot to the skill bot. The master bot can support multiple input and output channels.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or through a combination of software and hardware.

DABP 102 provides an infrastructure and various services and features that enable a use of DABP 102 to create a digital assistant including one or more skill bots associated with the digital assistant. For example, a skill bot can be created by cloning an existing skill bot, cloning an existing skill bot and then making modifications to the skill bot, or can be created from scratch using tools and services offered by DABP 102. In certain embodiments, DABP 102 provides a skills store or skills catalog offering multiple skill bots for performing various tasks. A user of DABP 102 can clone a skill bot from the skills store and create a new skill bot.

DABP 102 also enables a user (e.g., a skill bot designer) to create a skill bot from scratch. In certain embodiments, at a high level, creating a skill bot involves the following operations:

(1) Configuring settings for a new skill bot;
(2) Configuring one or more intents for the skill bot;
(3) Configuring entities for one or more intents;
(4) Training the skill bot;
(5) Creating a dialog flow for the skill bot;
(6) Adding custom components to the skill bot; and
(7) Testing and deploying the skill bot.

(1) Configuring settings for a new skill bot—A skill bot designer can specify one or more invocation names for the skill bot being created. These invocation names can be used in utterances to explicitly identify and invoke the skill bot in the digital assistant. The skill bot designer may also specify example utterances for the skill bot. These example utterances are representative of utterances for the skill bot. When user inputs are received, the intent analysis engine of the digital assistant compares the user inputs to these example utterances to determine if the particular skill bot is to be invoked.

(2) Configuring one or more intents for the skill bot—The skill bot designer may configure one or more intents (also referred to as bot intents) for the skill bot being created. These intents identify tasks that the skill bot can perform for end users of the digital assistant. Each intent is given a name. For example, for a skill bot configured to help users perform various banking transactions, intents may be specified by the skill bot designer for the skill bot, such as "Check Balance," "Transfer Money," "Deposit Check," and the like. For each intent, the skill bot designer specifies a set of example utterances that are representative of and illustrate the meaning of the intent and are typically associated with the task performed by that intent. For example, for the "Check Balance" intent, example utterances may include "What's my savings account balance?", "How much is in my checking account?", "How much money do I have in my account," and the like. Permutations of typical user requests and statements may also be specified as example utterances for an intent.

(3) Configuring entities for one or more intents of the skill bot—In some instances, additional context may be needed to enable the skill bot to properly respond to a user request. For example, there may be situations where two or more user input utterances resolve to the same intent in a skill bot. For instance, in the above example, utterances "What's my savings account balance?" and "How much is in my checking account?" both resolve to the same "Check Balance" intent, but these utterances are different requests asking for different things. To clarify such requests, one or more entities are added to an intent. Using the banking skill example, an entity called "Account Type," which defines values called "checking" and "saving," may enable the skill bot to parse the user request and respond appropriately. One or more entities can be specified for certain intents configured for the skill bot. Entities are thus used to add context to the intent itself. Entities help describe an intent more fully and enable the skill bot to complete a user request. In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an "Account Type" entity may be defined by the skill bot designer to enable various banking transactions by checking the user input for keywords like "checking," "savings," "credit cards," and the like.

(4) Training the skill bot—A skill bot is configured to receive user input, parse or otherwise process the received user input, and identify or select an intent that is relevant to the received user input. In order for this to happen, the skill bot may be trained. In certain embodiments, a skill bot is trained based upon the intents configured for the skill bot and the example utterances associated with the intents (collectively, the training data), so that the skill bot can resolve user input to one of its configured intents. In certain embodiments, a skill bot is represented by a model that is trained using the training data and allows the skill bot to discern what end users say (or in some cases, are trying to say). DABP 102 provides various different training techniques that can be used by a skill bot designer to train a skill bot, including various machine-learning-based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the skill bot can then be used to handle and respond to user utterances. In certain cases, a user's utterance may be a question that requires only a single answer and no further conversation. In order to handle such situations, a Q&A (question-and-answer) intent may be configured for a skill bot. This enables a skill bot to output replies to user requests without having to update the dialog definition. Q&A intents are created in a similar manner as regular intents. The dialog flow for Q&A intents is however different from regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take (e.g., how the skill bot responds to user utterances, how the skill bot prompts users for input, how the skill bot returns data, etc.). The dialog flow is like a flowchart followed by the skill bot. The skill bot designer specifies a dialog flow using a language, such as a markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the end users that the skill bot services.

In certain embodiments, the dialog flow definition contains three sections:
(a) a context section;
(b) a default transitions section; and
(c) a states section Context section—The skill bot designer can define variables that are used in a conversation flow in the context section. Other variables that may be named in the context section include, without limitation, variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transitions section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when it is desired to provide end users with the option to temporarily leave a first skill they are engaged with to do something in a second skill within the digital assistant. In one example, if an end user is engaged in a conversation with a shopping skill (e.g., the user has made some selections for purchase), the end user may want to jump to a banking skill (e.g., the end user may want to ensure that he/she has enough money for the purchase), and then return to the shopping skill to complete the end user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed for the states. Components enable a skill bot to perform the functions. In certain embodiments, DABP 102 provides a set of pre-configured components for performing a wide range of functions. A skill bot designer can select one of more of these pre-configured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit, which applies when the end user signals the desire to exit the current conversation or context in the digital assistant; (2) Help, which applies when the end user asks for help or orientation; and (3) Unresolved Intent, which applies to user input that does not match well with the Exit and Help intents. The digital assistant also stores information about the one or more skill bots associated with the digital assistant.

At the master bot or digital assistant level, when an end user inputs a phrase or utterance to the digital assistant, the digital assistant is configured to perform processing to determine how to route the conversation. The digital assistant determines this using a routing model, which can be rules-based, artificial intelligence-based, or a combination thereof. The digital assistant uses the routing model to determine whether the conversation corresponding to the user input is to be routed to a particular skill for handling, is to be handled by the digital assistant or master bot itself based on a built-in system intent, or is to be handled as a different state in a current conversation flow.

In certain embodiments, as part of this processing, the digital assistant determines if the user input identifies a skill bot using its invocation name. An invocation name present in the user input may be treated as an explicit invocation of the skill bot corresponding to the invocation name. In such a scenario, the digital assistant may route the user input to the explicitly invoked skill bot for further handling. If there is no specific invocation, in certain embodiments, the digital assistant evaluates the received user input and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a confidence threshold routing parameter) is selected as a candidate for further evaluation. The digital assistant then selects, from the identified candidates, a particular system intent or a skill bot for further handling of the user input. In certain embodiments, after one or more skill bots are identified as candidates, the intents associated with those candidate skills are evaluated (according to the intent model for each skill) and confidence scores are applied to each intent. In general, any intent that has a confidence score exceeding a threshold value is treated as a candidate flow. If a particular skill bot is selected, then the user input is routed to that skill bot for further processing. If a system intent is selected, then one or more actions are performed according to the selected system intent.

As described above, a skill (also referred to as a bot, a chatbot, chatterbot, skill bot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to learn a programming language and download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, a person of ordinary skill in the art will recognize that the message may be an HTTP post call message, a SMS message, or any other types of communication between two systems.

End users may interact with the bot system through a conversational interaction (sometimes referred to as a conversational user interface (UI)), just like interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another. The interaction may also be an informational interaction with, for example, a human resource (HR) bot, such as checking for vacation balance. The interaction may be an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input, the bot may determine the end user's intent in order to determine the appropriate next action to take.

An intent may include a goal that the end user would like to accomplish. An intent maps an end user input to actions that a backend system could perform for the end user. Therefore, based on the phrases uttered by the end user in a natural language, the bot may map the end user utterance to a specific use case or job, such as ordering pizza, getting account balance, transferring money, making a purchase, making a return, and the like. Human conversations are often non-linear in nature. End users may often branch into different states during a conversation. For example, if an end user wants to transfer funds from account A to a recipient, the end user may start a conversation with the bot system by, for example, asking the bot to pay the recipient for dinner. The bot may respond with, for example, "from which account?". The end user may pick a checking account but may then realize that he or she is not sure about the balance in the account. Thus, the end user may switch context to ask for balance and recent transactions, and so on. In other words, the end user may trigger changes in the flow and states, for example, from transferring money to checking balance, and then to recent transactions. At a certain time point, the end user may decide to return to the original intent—paying the recipient. Thus, one task of the bot system is to dynamically determine end user intents from natural language utterances.

A bot may use a natural language processing (NLP) engine and/or a machine-learning model (e.g., an intent classifier) to map end user utterances to specific intents. For example, a machine-learning-based NLP engine may learn to understand and categorize the natural language conversations from the end users and extract necessary information from the conversations to be able to take precise actions, such as performing a transaction or looking up data from a backend system of record.

Figure 2:
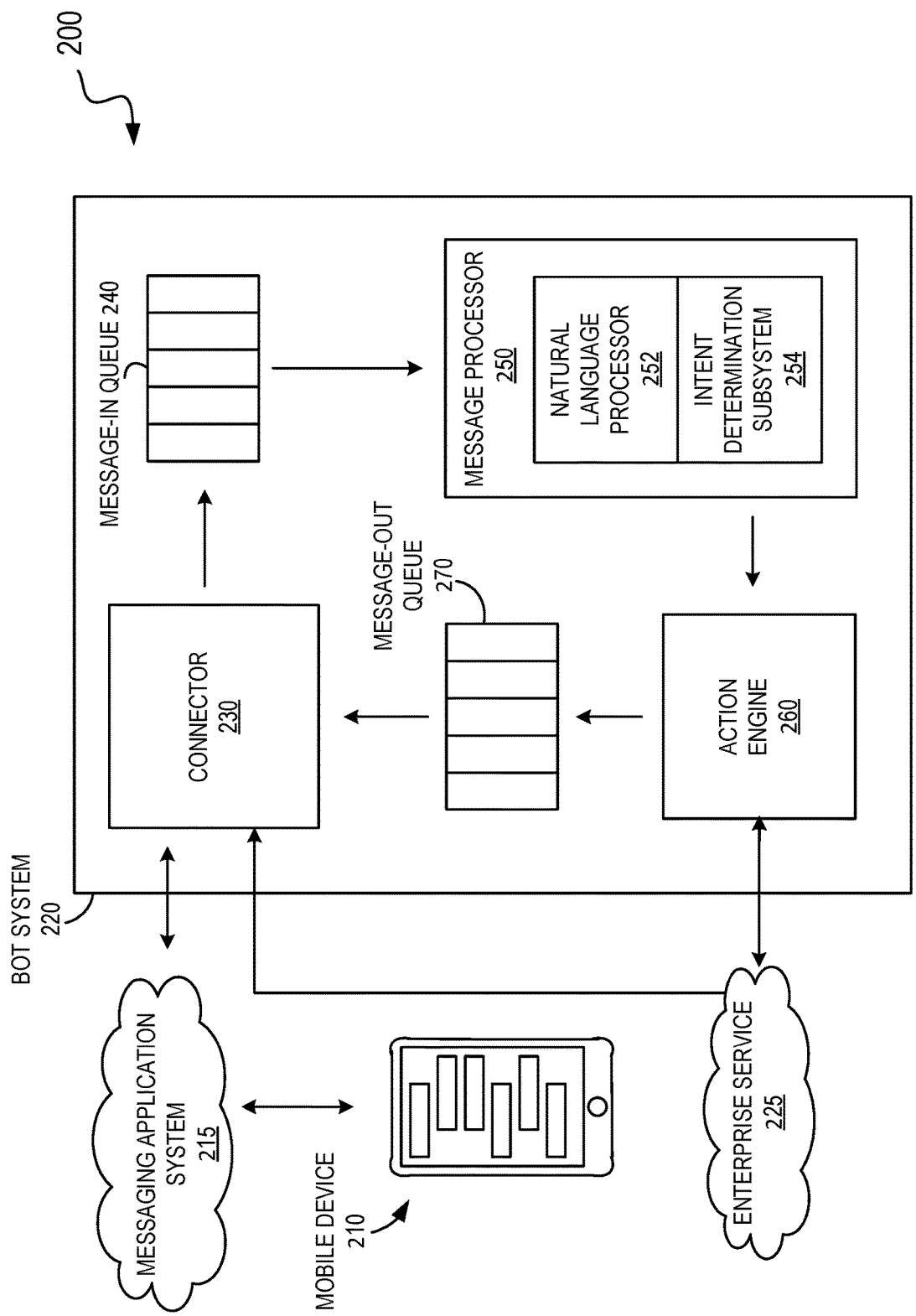
FIG. 2 depicts a distributed system that implements a bot system for communicating with end users using one or more messaging applications according to certain embodiments.

FIG. 2 depicts a distributed system 200 that implements a bot system for communicating with an end user using a messaging application according to certain embodiments. System 200 may include a bot system 220, one or more messaging application systems 215, and one or more end user devices, such as one or more mobile devices 210. In some examples, the messaging application may be installed on an electronic device (e.g., a desktop computer, a laptop, mobile device 210, or the like). While the discussion herein will reference a mobile device and a messaging application, a person of ordinary skill in the art will recognize that any electronic device may be used and any messaging platform or messaging application may be used, such as FACEBOOK® Messenger, WHATSAPP® instant messaging software, WECHAT® mobile text and voice messaging communication service, KIK® Messenger, TELEGRAM® Messenger, SKYPE MOBILE® messenger, Short Message Service (SMS), or any other messaging application that provides a platform for end users to communicate. In other examples, the messaging application may be run through a browser (e.g., GOOGLE CHROME® browser, MOZILLA® FIREFOX® browser, and INTERNET EXPLORER browser) that is installed on mobile device 210. In some embodiments, two or more messaging applications may be installed on an end user device for communicating through two or more messaging platforms (such as two or more messaging application systems 215).

The messaging application may be facilitated by a messaging platform, such as messaging application system 215. Mobile device 210 may be connected to messaging application system 215 by a first network (e.g., the Internet). Messaging application system 215 may be a messaging platform provided by a third party, such as Facebook, Tencent, Google, Microsoft, etc. Messaging application system 215 may manage content sent and received through the messaging application across multiple mobile devices or other end user devices.

A bot system 220 (e.g., implemented on one or more servers) may also be communicatively connected to messaging application system 215 to send and receive massages. The communication between messaging application system 215 and bot system 220 may be through a second network (e.g., the Internet). The first network and the second network may be the same network, or they may be similar or completely different networks. Messaging application system 215 may route content (e.g., a message or information from a message) from mobile device 210 to bot system 220 using the Internet. In some embodiments, the destination of the content (e.g., an identification of bot system 220) may be included in the content as a nominal addressee. In some embodiments, bot system 220 may also be configured to communicate with two or more messaging application systems 215.

As discussed above, the content being exchanged between end users or between an end user and a bot system may include, for example, text, emojis, audio, media (e.g., a picture, a video, a link), or any other method of conveying a message. An example of a message received by bot system 220 from, for example, FACEBOOK® Messenger may include:

```
{
    "channel": {
        "tenant_id": "DemoTenant",
        "client_data": {
            "channel_user_id": "1103645260000000",
            "type": "facebook",
            "chat_id": "1103645260000000"
        },
        "type": "facebook",
        "bot_id": "DemoBot",
        "client_id": "facebook"
    },
    "id": "411fc848-350b-47de-89c3-a0ecee314401",
    "text": "May I have a cheese pizza?",
    "type": "text"
}
```

Bot system 220 may receive the content from messaging application system 215 using a connector 230 that acts as an interface between messaging application system 215 and bot system 220. In some embodiments, connector 230 may normalize content from messaging application system 215 such that bot system 220 may analyze content across different messaging application systems. The content normalization processing may include formatting content from each type of messaging application to a common format for processing. In some embodiments, bot system 220 may include one or more connectors for each of the messaging applications (such as FACEBOOK® Messenger, WHATSAPP® instant messaging software, WECHAT® mobile text and voice messaging communication service, KIK® Messenger, TELEGRAM® Messenger, and SKYPE MOBILE® messenger, a Short Message Service (SMS)). In some implementations, connector 230 may route the content to a message-in queue 240. Message-in queue 240 may include a buffer (e.g., a first-in first-out (FIFO) buffer) that stores content in the order received. In some embodiments, each connector 230 may be associated with one or more message-in queues.

Message-in queue 240 may send the content to a message processor 250 when message processor 250 becomes available. In some embodiments, message processor 250 may pull the content from message-in queue 240. Message processor 250 may parse a message and determine an intent of the parsed message as described in detail below. In some embodiments, message processor 250 may include a natural language processor 252 and an intent determination subsystem 254. Natural language processor 252 may parse a message and perform certain semantic analysis, such as identifying a subject, a predicate (e.g., an action), and/or an object. Intent determination subsystem 254 may determine an end user intent based on the parsed message. As described above, the intent may include a purpose of the message. For example, a purpose of the message may be to order a pizza, order a computer, transfer money, ask a question regarding delivery, etc. In some embodiments, parameters associated with the intent that more specifically define or clarify the action to take, which may be referred to as entities, may also be extracted from the message by natural language processor 252 and/or intent determination subsystem 254.

After the end user intent is determined based on the content by message processor 250, the determined intent (and the parameters associated with the intent) may be sent to an action engine 260. Action engine 260 may be used to determine an action to perform based on the intent (and the parameters associated with the intent) and the current state (or context) of a state machine as described above. For example, action engine 260 may send certain outbound content to message-out queue 270 as the response and/or may send a command to or retrieve information from some enterprise services, such as enterprise service 225. Message-out queue 270 may send the outbound content to connector 230. Connector 230 may then send the outbound content to a messaging application system indicated by action engine 260, which may be the same as or different from messaging application system 215. Messaging application system 215 may then forward the outbound content to the messaging application on mobile device 210.

Bot system 220 may communicate with one or more enterprise services (e.g., enterprise service 225), one or more storage systems for storing and/or analyzing messages received by bot system 220, or a content system for providing content to bot system 220. Enterprise service 225 may communicate with one or more of connector 230, action engine 260, or any combination thereof. Enterprise service 225 may communicate with connector 230 in a manner similar to messaging application system 215. Enterprise service 225 may send content to connector 230 to be associated with one or more end users. Enterprise service 225 may also send content to connector 230 to cause bot system 220 to perform an action associated with an end user. Action engine 260 may communicate with enterprise service 225 to obtain information from enterprise service 225 and/or to instruct enterprise service 225 to take an action identified by action engine 260.

In some embodiments, bot system 220 may include one or more timers. A timer may cause action engine 260 to send content to an end user using connector 230 and messaging application system 215 after an amount of time has lapsed. In some embodiments, a timer may send content to bot system 220 similar to an end user or enterprise service 225. For example, the timer may send a message to bot system 220 to be analyzed as a message from an end user would be analyzed.

In one specific embodiment, an end user may send a message to bot system 220 using mobile device 210 through messaging application system 215. The message may include a greeting, such as "Hello" or "Hi." The bot system may determine that a new conversation has begun with the end user and start a state machine. In some embodiments, the bot system may identify one or more characteristics of the end user. For example, the bot system may identify a name of the end user using a profile associated with the end user on the messaging application system. Using the one or more characteristics, the bot system may respond to the end user on the messaging application. The response may include a message to the end user that responds to the message received from the end user. For example, the response may include a greeting with the name of the end user, such as "Hi Tom, What can I do for you?". Depending on the enterprise associated with the bot system, the bot system may progress to accomplish a goal of the enterprise. For example, if the bot system is associated with a pizza delivery enterprise, the bot system may send a message to the end user asking if the end user would like to order pizza. The conversation between the bot system and the end user may continue from there, going back and forth, until the bot system has completed the conversation or the end user stops responding to the bot system.

In some embodiments, the bot system may initiate a conversation with an end user. The bot system-initiated conversation may be in response to a previous conversation with the end user. For example, the end user may order a pizza in the previous conversation. The bot system may then initiate a conversation when the pizza is ready. In some embodiments, the bot system may determine the pizza is ready when an indication is received from the enterprise associated with the bot system (e.g., an employee sending a message to the bot system that the pizza is ready). The conversation may include a message sent to the end user indicating that the pizza is ready.

In some embodiments, the bot system may send a message to the end user on a different messaging application than the messaging application that a previous message was received. For example, the bot system may determine to send the message using Short Message Service (SMS) rather than FACEBOOK® Messenger. In such implementations, the bot system may integrate multiple messaging applications.

In some embodiments, the bot system may determine to start a conversation based on a timer. For example, the bot system may determine to have a one-week-timer for an end user after a pizza is ordered. Expiration of the one-week timer may cause the bot system to start a new conversation with the end user for ordering another pizza. The timer may be configured by the enterprise and implemented by the bot system.

As described above, in some embodiments, action engine 260 may send command to or retrieve information from some enterprise services 225. For example, when bot system 220 (more specifically, message processor 250) determines an intent to check balance, bot system 220 may determine which of several accounts (e.g., checking or savings account) to check the balance for. If the end user inputs "What's my balance in my savings account," bot system 220 may extract "savings" and send a command to a bank server to check the balance, and then send the received balance information to the end user through a message. If the end user initially only uttered "what's the balance in my account?", bot system 220 may send a message to the end user prompting the end user to further specify the specific account, or may retrieve information for all accounts of the end user and send the account information to the end user for the end user to make a selection.

In some embodiments, the bot system may maintain information between conversations. The information may be used later so that the bot system does not need to ask some questions every time a new conversation is started between the end user and the bot system. For example, the bot system may store information regarding a previous order of pizza by the end user. In a new conversation, the bot system may send a message to the end user that asks if the end user wants the same order as last time.

In some embodiments, bot system 220 may store information associated with end users in a cache. The cache may write to a database to save the information after an outbound message is sent to the messaging application system from connector 230. In other embodiments, the cache may write to the data at different times (e.g., after a particular event, after each event, after an amount of time, or any other metric to determine when to write to the database).

Bot system 220 may allow each component to be scaled when slowdowns are identified. For example, if bot system 220 identifies that the number of messages that are arriving at connector 230 exceeds a threshold, an additional one or more connectors may be added to connector 230. In addition, the number of message-in queues, message processors, instances of action engines, and message-out queues may be increased depending on where the slowdown occurs. In such implementations, additional components may be added without having to add other additional components. For example, a connector may be added without having to add an additional instance of the action engine. In some implementations, one or more components, or a portion of a component, of bot system 220 may be run on a virtual machine. By running on a virtual machine, additional virtual machines may be initiated as desired.

As described above, building the bot system, such as the user intent classification engine that can determine the end user's intents based upon end user utterances, is a challenging task in part due to the subtleties and ambiguity of natural languages and the dimension of the input space (e.g., possible end user utterances) and the size of the output space (number of intents). As such, a new bot system may need to be monitored, debugged, and modified in order to improve the performance of the bot system and user experience with the bot system. In many cases, it may be difficult to more specifically identify the root causes of the lower than desired performance of the bot system and determine how to improve the bot system without using an analytics or optimization tools.

In some circumstances, a bot owner, developer, or administrator may want to monitor the operational status of a bot, and understand how the bot is being used and where end users abandoned the bot, in order to improve the bot. For example, the bot owner, developer, or administrator may want to know which bot conversations are successful and which ones are not, in order to identify and diagnose underperforming elements of the bot system.

According to some embodiments, an analytic system may be integrated with a bot system. The analytic system may monitor events occurred during conversations between end users and the bot system, aggregate and analyze the collected events, and provide information regarding the conversations graphically on a graphic user interface at different generalization levels, such as all conversations, different categories of conversation, and individual conversations. For example, the graphic user interface may display options to filter or select certain types of conversations or individual conversations, and display the selected information graphically, for example, by visualizing the paths of the conversations. The analytic system may also provide suggestions, options, or other information for improving the bot system.

Figure 3:
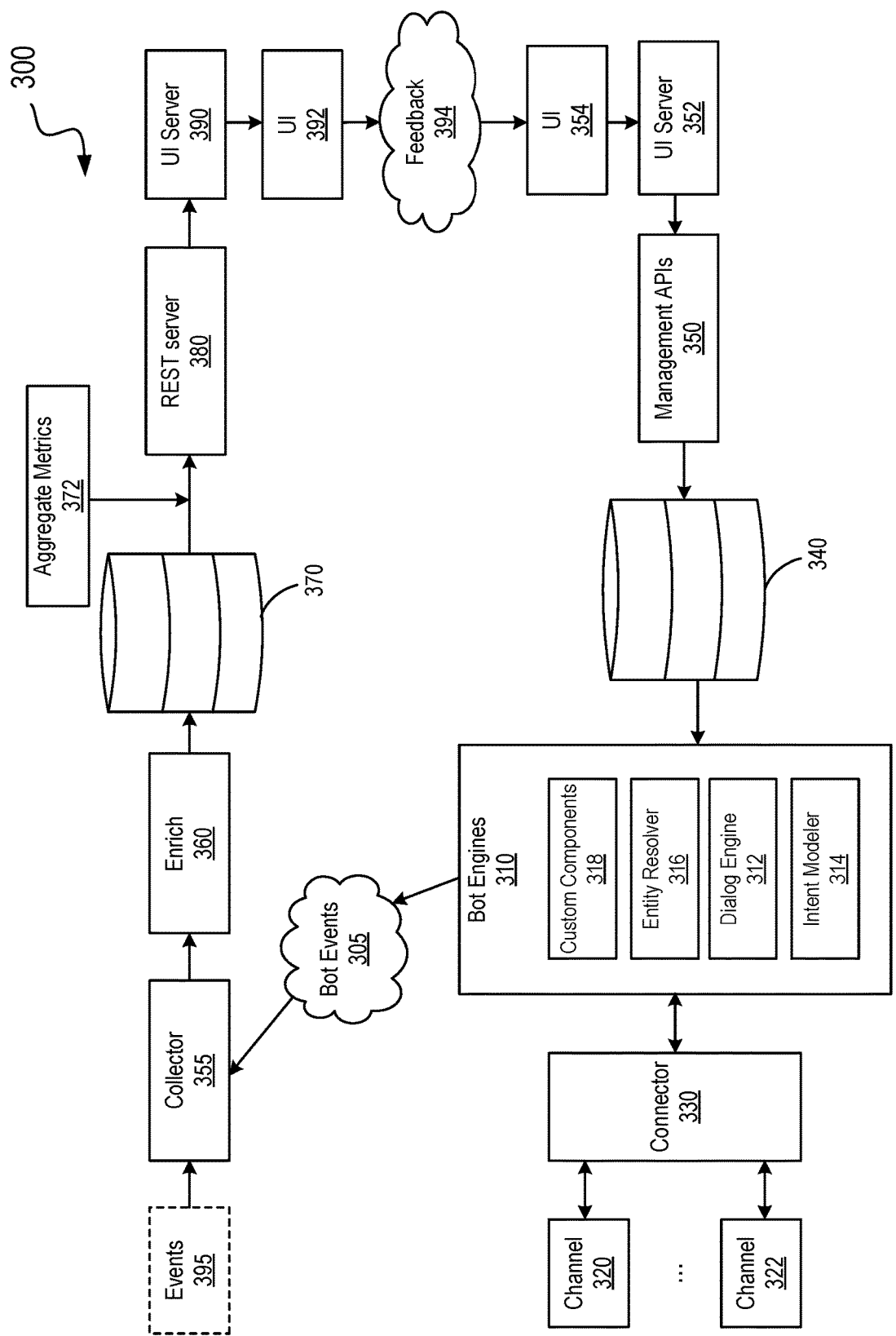
FIG. 3 depicts an integrated system including a bot system and a bot analytic system for monitoring, analyzing, visualizing, and improving the performance of a bot system according to certain embodiments.

FIG. 3 depicts an integrated system 300 including a bot system (such as bot system 220) and a bot analytic system for monitoring, analyzing, visualizing, and improving the performance of the bot system according to certain embodiments. As illustrated, the bot system may include a connector 330 and a plurality of bot engines, such as a dialog engine 312, an intent modeler 314, an entity resolver 316, and custom components 318. The bot system may also include a database 340, management application programming interfaces (APIs) 350, a user interface 354, and a UI server 352. The bot analytic system may include a collector 355, an enrichment engine 360, a database 370, and a REST server 380. The bot analytic system may also include a user interface 392 and a UI server 390. Collector 355 of the bot analytic system may collect events 305 occurred at the bot system. Feedback 394 from the bot analytic system may be provided to the bot system through user interface 392 and user interface 354.

Connector 330 may act as an interface between the bot system and one or more end users through one or more channels, such as channels 320 and 322. Each channel may be a messaging application, such as a messaging channel (such as Facebook Messenger, Facebook WhatsApp, WeChat, Line, Kik, Telegram, Talk, Skype, Slack, or SMS), a virtual private assistant (such as Amazon Dot, Echo, or Show, Google Home, Apple HomePod, etc.), a mobile and web app extension that extends native or hybrid/responsive mobile app or web application with chat capabilities, or voice based input (such as devices or apps with interfaces that use Siri, Cortana, Google Voice, or other speech input for interaction). In some embodiments, connector 130 may normalize content from different channels such that the bot system may analyze content across different messaging application systems. The content normalization processing may include formatting content from each type of messaging application to a common format for processing. In some embodiments, the bot system may include one or more connectors for each of the channels.

Intent modeler 314 may be used to determine end user intents associated with end user utterances. In some embodiments, intent modeler 314 for determining an intent of an end user based on one or more messages received by the bot system from the end user may use a natural language processor to tag the parts of speech (verb, noun, adjective), find lemmas/stems (runs/running/ran→run), and tag entities (Texas→LOCATION). In some embodiments, intent modeler 314 may normalize the message. For example, "Mary ran to Texas" may become "PERSON run to LOCATION." Intent modeler may also include logic to detect words which have the same meaning within an end user message. For example, if the training dataset includes: "Mary ran to Texas" and "Bob walked to Detroit," both mapped to the same intent, and run/walk appear in the same set of intents, intent modeler 314 may learn that for the purposes of intent resolution run=walk. In one illustrative example, "Mary ran to Texas" may become "PERSON run to LOCATION" and "Bob walked to Detroit" may become "PERSON walk to LOCATION." In the illustrated example, both sentences may be associated with a same intent because "noun run to noun" is the same as "noun walk to noun" for the purpose of intent resolution. In another example, "I want to order a large cheese pizza" and "I want to order a small pepperoni pizza" may both be normalized into "I want to order a Bots_PizzaSize Bots_Toppings pizza."

After normalization, a probability that the occurrence of a word may signify a certain intent may be determined. In some examples, probabilities can be combined using basic probability arithmetic as if they were independent. For example, if "order" suggests a 20% probability of ordering pizza, and "pizza" suggests a 10% probability of ordering pizza, the total probability would be $1-(1-0.2)(1-0.1)=$ 28%. Some probabilities may be based on presence of words, or based on certain language elements, like presence of negations or personal pronouns.

Another level of rule may be a template rule, which is a combination of words. In some examples, every sentence in a training dataset, once normalized, may automatically become a rule. In such examples, a training dataset may include a very small number of short sentences. The template rule may return a probability of 1. New rules may be generated from rules via a process of induction. For example, the following sentences may belong to track spending: "How much did I spend last month on gas?" and "How much did I spend in May on food?". The sentences may be used to induce the rule "How much did I spend" as that is the part which is shared between them. In other examples, the training dataset may include the phrase "How much did I spend" to achieve the same result.

Examples described above allow definitions of an intent to not include duplicates, such as variations on named entities (e.g., "Send money to Sue" and "Send money to Bob"). However, similar sentences where one or two words are different may be used for the training. Similar sentences may allow the model to learn which words may have the same meaning for intent resolution and which words may be common misspellings.

If a particular word or set of words (like the verb) is important to an intent, the probabilities may be manipulated by having more examples using such a word (and its synonyms) and fewer examples with such a word for other intents.

Examples may also be provided to prevent the model from making wrong assertions. For example, particular sub-phrases, or words only appearing for a certain intent, may cause wrong assertions. Similarly, the model may be prevented from synthesizing broad rules using similar sentences belonging to different intents for the training.

Entity resolver 316 may identify entities (e.g., objects) associated with the end user intents. For example, in addition to the end user intent identified by intent modeler 314, such as "order pizza," entity resolver 316 may resolve entities associated with the intent, such as the pizza type, toppings, and the like.

Dialog engine 312 may be used to handle the conversations between the end users and the bot system. For example, dialog engine 312 may respond to end user utterances based on the end user intent identified by intent modeler 314 and entities associated with the end user intent identified by entity resolver 316. In some embodiments, dialog engine 312 may use a state machine that includes user defined states (e.g., end user intents) and actions to take in the states or from state to state to handle the conversations with end users.

Custom components 318 may include customized modules for the specific bot system. For example, a financial bot may include custom components that may be used to, for example, check balance, transfer funds, or pay bills.

Database 340 may be used to store data for the bot system, such as data for the classification models, logs of conversation, and the like. Management APIs 350 may be used by an administrator or developer of the bot system to manage the bot system, such as retraining the classification models, editing intents, or otherwise modifying the bot system. The administrator or developer may use user interface 354 and UI server 352 to manage the bot system.

Various events may be generated while the bot system is running. The events may be generated based upon one or more instructions included in the bot system. For example, an event may be generated when the bot system has entered into a particular state, where the particular state is defined by an administrator or developer of the bot system. As events are generated, the events may be collected, stored, and analyzed by the bot analytic system. When capturing an event, additional information associated with the event may also be collected, where the additional information may indicate a present context in which the event is generated.

For example, conversation events may be generated by dialog engine 312. A conversation event may include a message received by a bot system from an end user device (referred to as msg_received). Msg_received may include one or more of the following parameters or variables: the content of the message, the time when the message is received by the bot system, the language of the message received, a device property (e.g., version or name), an operating system property (e.g., version or name), a geolocation property (e.g., an Internet Protocol address, a latitude, a longitude, or the like), identification information (e.g., a user ID, a session ID, a bot system ID, a tenant ID, or the like), a time stamp (e.g., device created, device sent, collector derived time stamp), the channel, or the like.

A conversation event may also include a message sent by a bot system to an end user device (referred to as msg_sent). Msg_sent may include one or more of the following: the content of the message (e.g., text or HTML of the message), the time when the message is sent by the bot system, the language of the message, a creator of the message (e.g., the bot system or an end user device), a device property, an operating system property, a browser property (e.g., version or name), an app property (e.g., version or name), a geolocation property (e.g., an Internet Protocol address, a latitude, a longitude, or the like), identification information (e.g., a user ID, a session ID, a bot system ID, a tenant ID, or the like), a channel (e.g., Facebook or Webhook), or the like.

Dialog engine 312 may also generate dialog state execution events. As described above, dialog engine 312 may use a state machine to determine the flow of the conversations with end users. The state machine may include a set of states and rules of transition between the states. Dialog engine 312 may execute the state machine for each end user conversation, and a dialog state execution event may be produced for each state that dialog engine 312 steps through to process end user utterances. Attributes of a dialog state execution event may include, for example, a state name, component name, next action, entity match, intent match, variable, user query statement, response statement, time of execution, communication language, device property, operating system property, geolocation property, identification information, a time stamp, a channel, or the like. The state name may be a name of a state currently executed or an "error state." The component name may be a name of a bot component executed for a current state. The next action may be a next action to be executed. The entity match may be an entity resolved in a current message. The intent match may be an intent resolved with a score value. The variable may be a variable value for a current state. The query statement may be a message sent by an end user. A response statement may be a message sent to an end user. The time of execution may be a time stamp of a completed state execution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

An intent resolution event may occur as a result of the execution of intent modeler 314. Intent modeler 314 may use trained or otherwise defined classification models to identify the end user intents from a set of intents based on the end user utterances. The result of the intent classification may be captured as intent resolution event attributes, which may include, for example, the final intent classification result (e.g., the identified intent) and confidence score associated with each respective intent in the set of intents.

Entity resolver 316 may generate entity resolver events. Entities are objects associated with end user intents. Entity definition rules may be determined when the bot system is created. For example, in addition to resolving end user intents, such as "order pizza," the bot system may also use entity resolver 316 to resolve associated entities, such as pizza type, toppings, and the like. An entity resolver event may be captured at an entity resolution. Examples of attributes associated with an entity resolver event may include an entity name, a rule applied, a search term, a state resolved, a query statement, an entity type, a time of execution, a communication language, a device property, an operating system property, a browser property, an app property, a geolocation property, identification information, a time stamp, a channel, or the like. The entity name may be a name of an entity currently being resolved. The rule applied may be, for example, preceding, following, or aggregate. The search term may be from, to, destination, origin, or the like. The state resolved may be a dialog state resolved for the entity. The query statement may be a message containing entity value. The entity type may be system or derived. The time of execution may be a time stamp of an entity resolution. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

A custom component may also generate events, such as a predefined event or a custom event. The predefined event may be a property captured at an execution of a custom component. Examples of attributes of the predefined event may include: a component name, an event name, a payload, a time of execution, a communication language, a device property, an operating system property, a browser property, an app property, a geolocation property, identification information, a time stamp, a channel, or the like. The component name may be a name of a custom component currently being executed. The event name may be invoked, invocation_failed, replied, replied_failed, or the like. The payload may be, in case of failure, reason for failure, stack trace, or the like. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

The custom component may also issue a custom event during execution of a custom component. Examples of attributes of the custom event may include a component name, an event name, a custom payload, a time of execution, a communication language, a device property, an operating system property, a browser property, an app property, a geolocation property, identification information, a time stamp, a channel, or the like. The component name may be a name of a custom component currently being executed. The event name may be a user-defined event name (e.g., Balance_Retrieved). The payload may be, for example, {"amount": "USD 100", "account": "checking"}. The time of execution may be a time stamp indicating when an event occurred. The communication language may be a language of a message being conversed. The device and/or operating system property may be associated with an end user interacting with the bot system. The browser and/or app property may be associated with an end user interacting with the bot system. The geolocation property may be a location of an end user interacting with the bot system.

Error events and timeout events may also be generated by the bot system during execution. An error event may be generated when an error occurs. A timeout event may be generated when the end user conversation has been inactive for a period of time, which may be configured at the channel.

The bot analytic system may collect the events and additional information as the bot system conducts conversations with end users and generates the corresponding events. For example, collector 355 may collect the events and the additional information and send the collected information to a queue. In some embodiments, collector 355 may be configurable and can be programmed to collect different events and/or event attributes described above as desired. For example, collector 355 may be configured to capture dialog state attributes, intent resolution attributes, entity resolution attributes, and error and timeout attributes. In some embodiments, collector 355 may also be configured to collect information regarding events 395 generated by a system other than the bot system.

Enrichment engine 360 may perform validation and enrichment on the collected events and other information and write them to database 370. For example, based on a collected IP address, enrichment engine 360 may determine the location of the end user associated with the IP address. As another example, enrichment engine 360 may extract certain features from the collected information, such as determining a web browser or channel used by the end user. REST server 380 may analyze the enriched events and other information and generate various reports based on certain aggregate metrics 372. The reports may be displayed to an owner, administrator, or developer of the bot system on user interface 392 through UI server 390. The owner, administrator, or developer of the bot system may provide feedback 394 to the bot system for improving the bot system.

Figure 4:
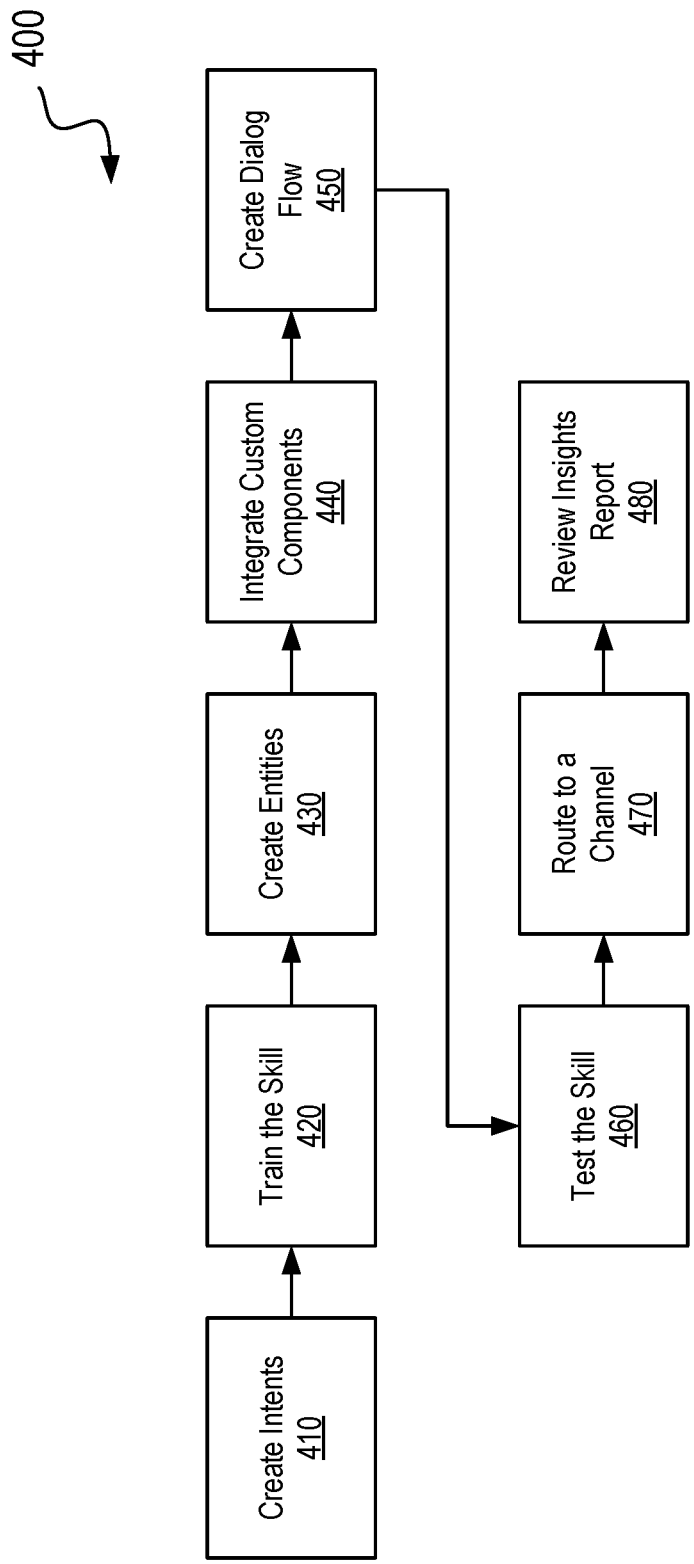
FIG. 4 is a simplified flowchart illustrating an example of a process for developing a bot according to certain embodiments.

FIG. 4 is a simplified flowchart 400 illustrating an example of a process for developing a skill according to certain embodiments. The process may include creating intents at 410, training the skill at 420, creating entities as 430, integrating custom components at 440, creating dialog flow at 450, testing the skill at 460, routing to a channel at 470, and reviewing insights reports for improving the skill at 480.

At 410, intents for a skill may be created. Intents describes the various actions that a skill can help its end users to complete. For example, if the skill enables users to perform various banking transactions, the intents for the skill can include, for example, "Check Balance" or "Transfer Money." Intents not only describe what the skill can do, but may also be an integral part of the skill's intelligence. The intents enable the skill to recognize user input because each intent can have a set of typical user statements (i.e., utterances) associated with it. While these utterances may share the same meaning, they may be different (for example, "What's my savings account balance?" and "How much is in my checking account?").

At 420, the skill may be trained to infer user intents when it parses the user input. Specifically, the skill may be trained with the intents and their utterances (collectively, the training data), so that the skill can resolve the user input to one of the intents. The trained skill may not only recognize the sample phrases that belong to each intent, but also recognize similar phrases that correspond to each intent.

At 430, entities for the skill may be created. In some embodiments, the skill may need some additional context to complete a user request. While some user requests may be resolved to the same intent (e.g., "What's my savings account balance?" and "How much is in my checking account?" would both resolve to the "Check Balance" intent), they are asking for different things. To clarify the request, one or more entities may be added to an intent. Using the banking skill example, an entity "Account Type," which defines values such as "checking" and "saving," may enable the skill to parse the user request and respond appropriately.

At 440, custom components may be integrated into the skill. Before integrating components into the skill, the skill may recognize user input, but may not be able to respond to it. Components may enable the skill to perform is functions. The components may perform functions such as outputting text based on the intent that has been resolved from the end user's message, or perform tasks specific to a particular skill, such as checking an account balance.

At 450, a dialog flow may be created. The dialog flow describes how the skill reacts as different intents are resolved. The dialog flow defines operations or actions that a skill bot will take, such as how the skill bot responds to user utterances, how the skill bot prompts end users for input, how the skill bot returns data, and the like. In some embodiments, the dialog flow may be a flow chart that is described in a simple markdown language, such as a version of YAML (e.g., OBotML).

At 460, the skill may be tested after being developed and deployed in, for example, a digital assistant described above. The skill may be tested by having one or more conversations with the skill using one or more dialog flows.

Optionally, at 470, the skill may be routed to one or more channels for user messaging and other capabilities. For example, if the skill would not be added to a digital assistant, the skill can be added to one or more user messaging channels. Users can chat with the skill through one or more of these user messaging channels, such as various messaging platforms, proprietary messaging apps, and web pages. The skill would run on any of these channels, whether they are text-only or can support scrolling cards, UI elements, images, and other non-text content. In addition to user-interfacing channels, a skill may be routed to other channels, such as a channel that links the skill to a customer-support system or a channel that routes notifications from an external application that prompts the skill to initiate a conversation.

At 480, a developer may review the insight reports to improve the skill. For example, the developer can review the insight reports related to the skill to find out if the customers are using the skill as intended. The insight report may include, for example, high-level usage metrics and conversation trends, individual views of intents, their execution paths, and conversation transcripts. The insight reports may provide different perspectives on how well the skill supports its customers, and where it prevents them from completing a task. These insight reports may not only let the developer to spot problems quickly, but may also suggest user inputs that can improve the skill's intent resolution.

In some embodiments, different versions of a skill mat be generated. In some embodiments, a skill may be a composite skill that includes two or more related skills to perform a more complex function as described above. For example, a composite skill A may include a skill B and a skill C, where, for example, outputs from skill B may be used as inputs to skill C.

II. Skills Store

As described above, enterprises or individuals that need to use a bot to communicate or otherwise interact with end users may not have the expertise to build the skills. In many cases, skills may be built by developers as described above and made available to enterprises or individuals. The developed skills may be made available at a skills store. In some embodiments, the skills store may allow developers and partners (or customer) to publish skills. The skills store may allow developers to upload skill packages to the skills store as part of product release. In some embodiments, pushing a skill to the skills store may be available from a skill editing page. The skills store may have a specific directory structure and may provide detailed skill description.

The skills store may provide detailed skill descriptions. In some embodiments, a skills store may include a skills store UI that allows customers to access the skills store. In some embodiments, the skills store UI may use object store REST APIs to collect details of the skills and facilitate browsing of the skill functionality. Skills, versions, descriptions for skills, and additional data may be provided through the skills store UI for customers to view the available skills. For example, the skills store UI may allow customers to browse the skills, search for specific skills, search for specific version of a skill, search by keyword in name, summary, description, or the like, and sort skills by name, category, date, or the like. The category may be entered by developers when pushing the skills to the skills store. The skills may be displayed with the names, versions, short descriptions (e.g., summaries), long description details, and the like. In some embodiments, the skills store may have other functionality such as notifications, auto updates, and the like.

The skills store UI may also allow downloading of a specific skill version. The skills store UI may access the skills store through a management API. The management API may redirect all requests to the skills store via, for example, a Jersey REST client. The management API may use standard libraries to access a storage for retrieving authorization token/password. The account information may be stored in the bot's configuration.

The skills store may store the implementation and metadata of skills. The implementation of a skill may include pre-trained models in, for example, Java. The implementation of a skill may include, for example, implementation data for the intents, entities, custom components, dialog flow, models, and the like, for the skill. In some embodiments, the implementation of a skill may be stored in the skills store as a zip archive. The metadata of the skill may include information regarding the implementation of the skill, such as the name, category, version, short description (e.g., summary), long description details, and the like of the intents, entities, custom components, dialog flow, models, and the like, for the skill. For example, in some embodiments, the skills store may include a backend that can store skills in zip archives. The backend may parse and store binary data, create and store metadata in JSON format, and use overwrite parameters to control workflow with existing skills in the skills store. In some embodiments, the implementation and the metadata of a skill may be stored separately.

In some embodiments, the backend may also list all skills (e.g., showing the latest version by date) with pagination, sorting, and filtering support. The skills store may retrieve the version, summary, description information of a skill from the skill metadata. The backend may be configured to get all versions of a skill by name. The backend may allow downloading skills using the path to zip archive and installing the downloaded skill automatically. The backend may also allow deleting of all skills or deleting skills by names.

In some embodiments, the skills store may include a REST API that may be used to transfer content between different storages. In some embodiments, the skills store may include a REST API that may return all content for the skills store as zip archives. The skills store may also support the training model option during importing/exporting. For example, a bot import API in the management API may be used to import a skill and train it automatically. In some embodiments, a trained bot with models may be exported.

In some embodiments, the skills store may include a REST API that may be used to push skills to the skills store. The REST API may accept the zip archive and some details of a skill for uploading a skill to the skills store. In some embodiments, the REST API may use overwrite parameters to control workflow with existing skills in the skills store. In some embodiments, the REST API may not be available through the skills store UI such that customers may not be able to push skills to the store for security reasons.

In some embodiments, the skills store REST API may include various REST APIs, such as object storage REST API for accessing data in object storage (e.g., listing all containers or objects in a container or bucket, or downloading objects), and skills store management REST API for accessing data in object storage through bot's management API (e.g., with pre-installed JSON formatter). An external API that allows for calling endpoints (e.g., servers) from a management API container outside of the bot's environment may be used to upload and download skills. The user interface may use the skills store management REST API for browsing skills in skills store and install skills in local environments. For example, the skills store management REST API may list skills in response to a simple list request, list all bots in bot's environment, list recent bots in the skills store, and identify obsolete bots in bot's environment that were imported before from the skills store. The skills store management REST API may list skills with pagination or ordering. The skills store management REST API may list skills filtered by name, description, summary, category, and the like. In some embodiments, the skills store management REST API may list all versions of a skill with the same name. The skills store management REST API may allow downloading skills from the skills store using a download link path, downloading and installing skills from the skills store, deleting skills in the skills store by name and version, and the like. In some embodiments, the skills store REST API may include skills store uploading (push) REST API, skills store deleting (delete) REST API, skills store installing (pull) REST API, skills store installing all digital assistant skills (pull) REST API, or the like.

with one unique and non-editable object storage namespace that is global, spanning all compartments and regions. Bucket names may be unique within a tenancy. Within an object storage namespace, buckets and objects may exist in a flat hierarchy, or may be arranged in a directory structure to help navigate a large set of objects (for example, bots/skills/accounting, bots/skills/crm, etc.). A compartment may be a collection of related resources that can be accessed only by those who are explicitly granted access permission by an administrator. Compartments may help users to organize resources and control the access to those resources. The skills store may include a root compartment when a compartment is provisioned. An administrator can create additional compartments within the root compartment and add access rules for those compartments. A bucket may only exist in one compartment.

In some embodiments, each skill may be placed in a container with a name, such as "/bots/{uuid}.zip". The corresponding metadata may be created for each skill upon the uploading of the skill to the skills store in a file. The metadata file may be in JSON format, and may have a name such as "/bots/{name}/{version}/bot.json". An example of the metadata for a skill is shown below:

```
{
    "name": "AgentBot",
    "summary": "summary",
    "displayName": "Agent Bot",
    "version": "2.0",
    "id": "85102a7f-877b-4021-9b79-56eb3c4aa5e4",
    "publishedOn": "2018-09-04T23:53:42.923Z",
    "description": "test",
    "category": "GCM",
    "obsoleted": false,
    "links": [
        {
            "rel": "importLink",
            "href": "/management-api/v1/bots?train=false&path=bots/85102a7f-877b-4021-9b79-56eb3c4aa5e4.zip"
        },
        {
            "rel": "metadataLink",
            "href": "/management-api/v1/store/skills/AgentBot/versions/2.0/"
        },
        {
            "rel": "downloadLink",
            "href": "/management-api/v1/store/archives?path=bots/85102a7f-877b-4021-9b79-56eb3c4aa5e4.zip"
        },
        {
            "rel": "importTrainedModelLink",
            "href": "/management-api/v1/bots?train=true&path=bots/85102a7f-877b-4021-9b79-56eb3c4aa5e4.zip"
        }
    ]
}
```

In some embodiments, the skills store may be an object store, where any type of data, regardless of the content type, may be stored as an object. The object may include the object itself and metadata for the object. Each object may be stored in a bucket. A bucket may be a logical container for storing objects. Users or systems may create buckets as needed. A bucket may be associated with a single compartment that has policies for determining what actions a user can perform on the bucket and objects in the bucket. The skills store may include a namespace, which may be a logical entity that serves as a top-level container for all buckets and objects, allowing users to control bucket naming within the user tenancy. Each tenancy may be provided

III. Skill Extension

As described above, each skill may be defined by a set of artifacts (e.g., entities) representing the metadata needed for the configuration, training, and execution of the skill. Skills for specific functionality may be built by a Software as a Service (SaaS) provider to allow SaaS customers to download and use. In many cases, customization and extension of the skills may be needed. For example, customers may want to customize and/or extend factory-built skills in order to adjust them to specific features, processes, terminology, culture, and the like. A bot extensibility infrastructure that can provide extensibility of skills in a holistic, generic, flexible, safe, and maintainable way may be desired.

According to certain embodiments, a base skill may be customized or extended using bot extensions defined in JSON files. A bot extension may include the changes to be made to the base skill and can be apply to the base skill to customize or extend the base skill. The base skill includes original metadata to be customized and/or extended by an extension. Customization may refer to the alteration of one or more properties of existing metadata artifacts or resources of a skill. Extension may refer to the augmentation of existing metadata or addition of new artifacts or resources to the metadata of a skill. Depending on the granularity of changes applied, customization and extension may overlap. For clarity, simplicity, and readability, both customization and extension are herein referred to as "extension".

All metadata resources of a skill may be extended. These metadata resources may include, for example, (1) the top-level skill definition and its configurations and settings, (2) intents (which may be created, modified, or disabled), (3) entities (which may be created, modified, or disabled), (4) utterances (which may be created, modified, or disabled), (5) custom components (e.g., which may be created or modified), (6) conversation flow (which may be modified), and (7) resource bundle (e.g., adding new message key along with the default-language message, adding new supported languages, or adding/modifying translated messages).

In various embodiments, different combinations of these metadata artifacts may be allowed to be extended. In some embodiments, some metadata artifacts may be disabled. No extension may be allowed to remove or delete any metadata artifacts associated with a base skill.

The bot extensibility infrastructure disclosed herein may support the extension of any published version of a skill (i.e., the base Skill) via a management web application and/or REST API, such as Oracle Fusion App's App Composer or a bot's command-line interface (CLI) tool. Any artifact or resource in the skill metadata may be extensible. The infrastructure may allow clients to obtain, on demand, a representation of the differences between an extension and its corresponding base skill. The metadata associated with an extension may optionally support a definition of a test suite that may be used by the infrastructure to validate the extension when necessary. The solution may adhere to the bot's versioning capabilities, where every extension may have its own version separate from the version of its base skill, such that the base skill and extension can evolve separately. A version of an extension may keep track of the range of the base skill versions that the version of the extension is compatible with.

The bot extensibility infrastructure may support upgrades to base skills, and may determine changes between different versions of a base skill and the changes to be made to the upgraded metadata of an upgraded version of the base skill. An extension may still be applicable to its base skill after the base skill is upgraded to a newer version, as long as (1) the metadata compatibility is preserved, (2) no metadata change conflicts are detected or pending resolution, and (3) validation tests, if defined by the extension, are successfully executed on the extended skill. To support upgradability, the infrastructure may store and track versions of extension metadata separately from the base skill to which the extension may apply. This may allow one particular version of an extension to be valid and applicable throughout multiple upgrades or versions of its base skill, so long as those upgrades do not break the backwards compatibility described above.

The infrastructure may execute any validation tests defined by the extension. The infrastructure may provide meaningful feedback to identify any issues that may result in an extended skill to become invalid with the upgrade of its corresponding base skill. When an upgrade to the base skill breaks compatibility with an extension, the infrastructure may be able to detect the incompatibility as early as possible. The infrastructure may make its best effort to automatically resolve metadata conflicts during upgrade. In some embodiments, the infrastructure may provide meaningful feedback to clients/users regarding any issues it cannot resolve automatically. The infrastructure may abort the upgrade, automatically disable the incompatible extension, provide user friendly mechanisms to assist users with manual/interactive conflict resolution, and allow the users to publish a new version of the extension when needed.

According to certain embodiments, the bot extensions can, in most cases, be achieved by storing and managing the metadata pertaining only to the extension separately from the original base metadata that is being extended, such as only storing the differences or changes between the base skill and the extended skill. When applying the extension, the differences or changes may then be used to modify the base metadata. For example, a difference between two versions of a same skill may be calculated and stored in, for example, a JSON file, and the base skill may later be extended with the stored differences by modifying the metadata according to the JSON file to generate the extended skill from the base skill.

In some embodiments, multiple extensions may be applied on top of a base skill in an ordered stack (e.g., in layers), where one layer (e.g., one extension) may be "extended" on top of another layer (i.e., another extension or the base skill). However, using multiple extension layers may increase the overall complexity exponentially. Thus, in some embodiments, a single-layer solution for bot extension may be used for most, if not all, use cases. In some embodiments, the design and implementation of the infrastructure may be scalable to allow for adding new extension layers, if necessary, without redesigning or significantly modifying or refactoring the infrastructure.

There may be several ways to achieve these features. In some embodiments, metadata for the skills and extensions can be stored in the database in the JSON format. For example, the metadata artifacts of a base skill may be described in a JSON file and stored in the skills store, a JSON extension (e.g., RFC-6902 summarized at https://en.wikipedia.org/wiki/JSON_Patch) may be used to capture the differences between the base metadata artifacts and their extensions.

In one simplified example, some resources or metadata artifacts of a base skill may be described in an original document in a JSON file as:

```
{
    "baz": "qux",
    "foo": "bar"
}.
```

An extension representing the differences or changes between the base skill and the extended skill may be described in an extension document in a JSON file (referred to as a JSON extension document) as:

```
[
    { "op": "replace", "path": "/baz", "value": "boo" },
    { "op": "add", "path": "/hello", "value": ["world"] },
    { "op": "remove", "path": "/foo" }
].
```

Thus, applying the extension document in the JSON format to the original document may result in a new document (e.g., a JSON file describing some resources of the extended skill):

```
{
    "baz": "boo",
    "hello": ["world"]
},
``` where the value (e.g., "qux") for a resource "baz" may be replaced by a new value (e.g., "boo"), a resource "foo" and its value may be removed or disabled, and a new resource "hello" and its value may be added.

The JSON extension document may be a "semantic" difference document that identifies differences between the extended and original metadata. The JSON extension document may also be used for conflict resolution. Because the metadata for the base skills in the skills store is stored in JSON documents, no new metadata format would need to be introduced and no format conversion would be needed. Thus, the JSON extension documents used to store skill extensions are compatible with the existing metadata model for the skills, thereby minimizing impact on the existing code base, especially the model abstraction layer. The JSON extension would have minimum increase in storage requirements, and would allow the use of existing open-source Java libraries (e.g., JSON extension and Jackson) to implement the infrastructure for skill extension described herein.

In general, custom code may not be part of a skill's metadata. In some embodiments, the metadata of a skill may include one or more custom components. The custom components may include references and parameters that can allow the skill to execute the custom code. Therefore, the skill extensions may include the addition and/or modification of custom components, while the custom code itself may not be included in and stored with a skill extension's metadata. If a skill extension needs to modify the custom code associated with a custom component, the metadata for the custom component may be customized in the skill extension's metadata so that the extended skill can properly refer to the endpoint that can execute the desired custom code. The custom code itself may be provided through the mechanisms used for developing any other regular skill.

In some embodiments, a bot system may include an internal management service and REST APIs. The REST APIs may expose the bot's metadata as REST resources and may allow create, read, update, and delete (CRUD) operations on the bot's metadata. Because it is desirable to keep the extension model as close to the metadata model for the skills as possible, it may be desirable to use the management REST API to provide programmatic access to the extensibility functionality.

Techniques disclosed herein allow clients to interact with extensions and regular bots as seamlessly as possible. The techniques would also have minimum impact on existing UI code and can simplify the implementation of extensibility in the UI because no other new REST API would need to be adopted. Techniques disclosed herein can also be used for other application management databases, such as MongoDB, where different reversions or extensions to an application may be stored by storing only the differences between the reversions or extension to the application and the original application in JSON documents.

Figure 5:
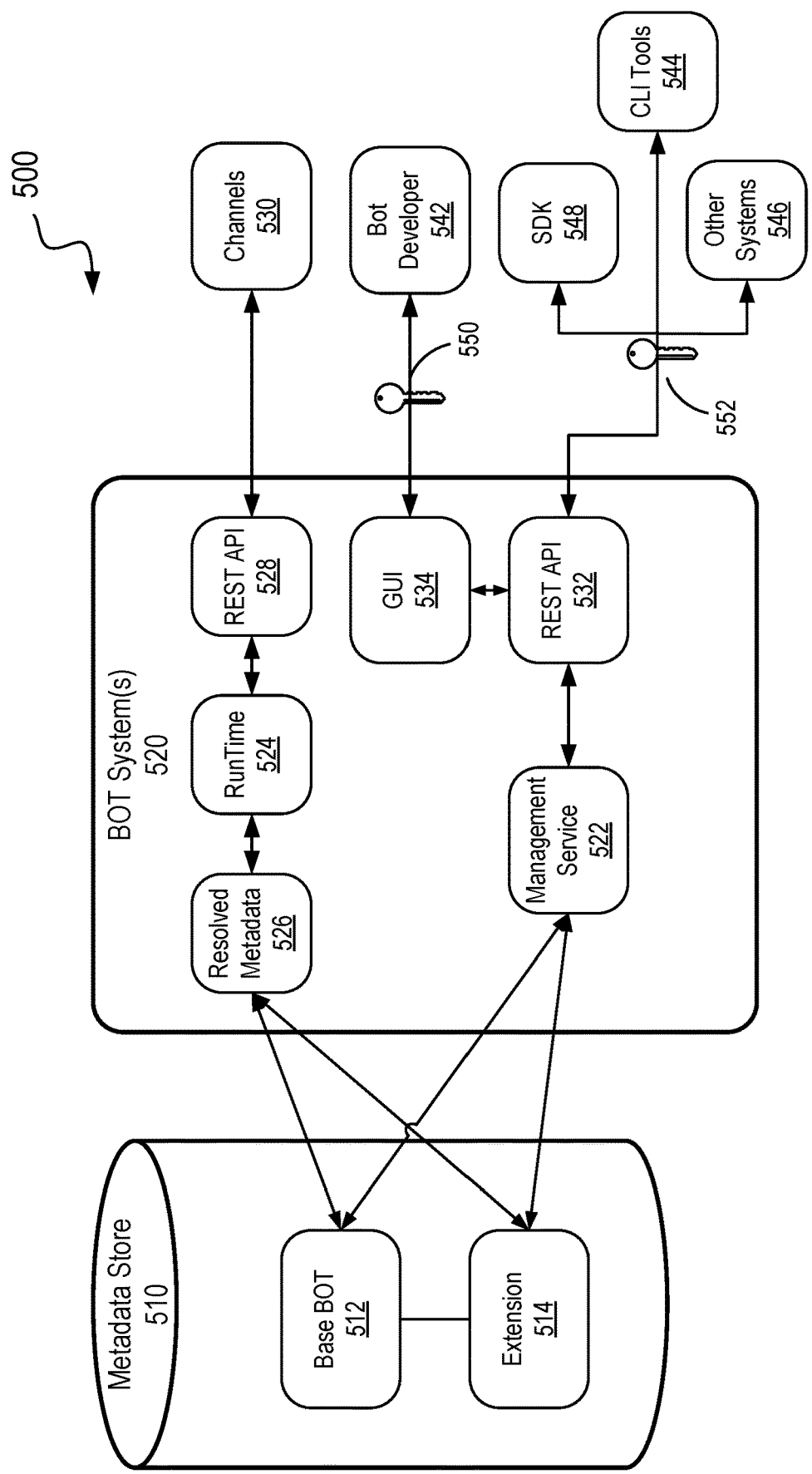
FIG. 5 depicts a system block diagram of an example of a bot extensibility infrastructure according to certain embodiments.

FIG. 5 depicts a system block diagram of an example of a bot extensibility infrastructure 500 according to certain embodiments. Bot extensibility infrastructure 500 may include a metadata store 510 that can store metadata 512 for base bots and metadata 514 for skill extensions. In some embodiments, metadata store 510 may be part of the skills store described above.

Bot extensibility infrastructure 500 may also include one or more bot systems 520, where each bot system 520 may include a management service application 522 and a runtime application 524. Management service application 522 may be used to create the extension, store the extension, track the versions of skills and extensions, check the compatibility between an extension and a base skill, and rebase an extension to a different version of a base skill. A bot developer may create an extension to a base skill, store the extension in metadata store 510, track the versions of the base skill and extensions to the base skill, check the compatibility between metadata 514 for an extension and metadata 512 for the base skill, or rebase an extension to a different version of the base skill, at a bot developer device 542 connected to management service application 522 through a secure link 550, a GUI 534, and a REST API 532. In some embodiments, the creating and managing of the extensions can be performed using management service application 522 and REST API 532 through, for example, CLI tools 544, a software development kit (SDK) 548, or other systems 546, which may be connected to REST API 532 through a secure link 552.

To execute an extended skill, bot system 520 may obtain metadata 512 for the base skill and metadata 514 for an extension from metadata store 510, apply metadata 514 to metadata 512 to generate a new resolved metadata 526. Runtime application 524 may execute the extended skill using the implementation of the base skill and resolved metadata 526. For example, runtime application 524 may apply the metadata to the implementation of the base skill and communicate with end users through a REST API 528 and various channels 530.

As described above, the bot extensibility infrastructure may store and track versions of bot extensions separately from the base skill to which the bot extensions may apply. This may allow one version of a bot extension to be applicable throughout multiple upgrades or versions of a base skill, so long as the upgrades do not break the backwards compatibility as described above. This may also allow different extensions to be applied to a same base skill.

Figure 6:
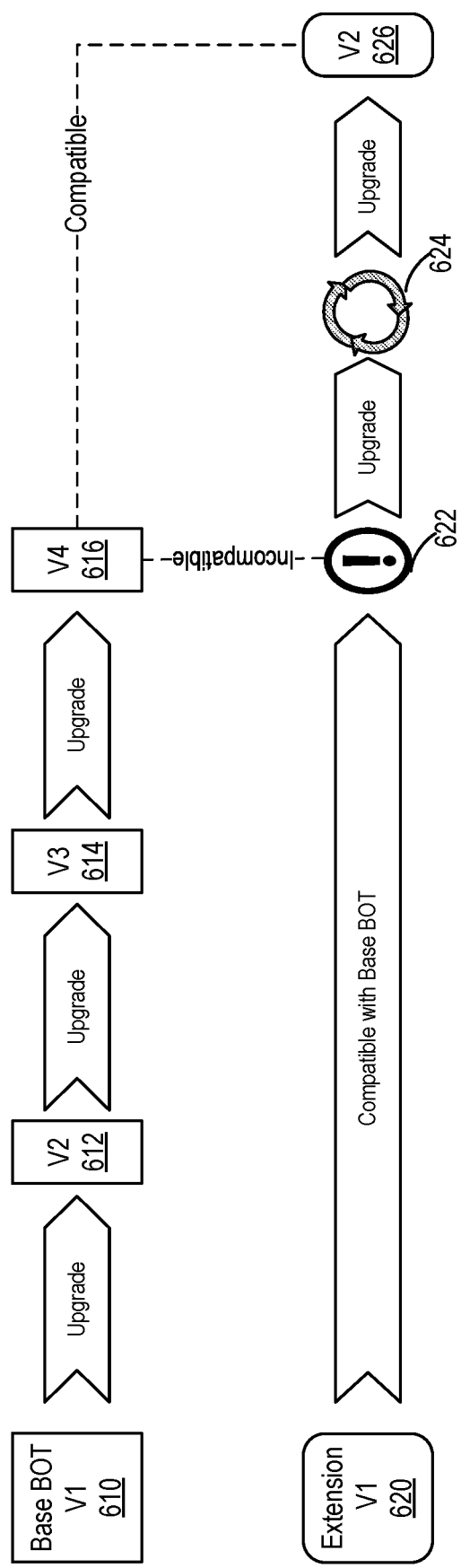
FIG. 6 illustrates an example of tracking versions of base bots and versions of bot extensions and the compatibility between the versions of the base bots and the versions of the bot extensions in a bot extensibility structure according to certain embodiments.

FIG. 6 illustrates an example of tracking versions of base bots and versions of bot extensions and the compatibility between the versions of based bots and the versions of bot extensions in a bot extensibility structure according to certain embodiments. In the example illustrated in FIG. 6, there may be four versions of a base bot, including version 1 (610), version 2 (612), version 3 (614), and version 4 (616). A version 1 (620) of an extension of the base bot may be created based on version 1 (610) of the base bot. A management service application, such as management service application 522, may check the compatibility between versions of the bot extension and versions of the base bots. When an upgrade to the base skill breaks the compatibility with an extension, the infrastructure may be able to detect the incompatibility as early as possible. In the illustrated example shown in FIG. 6, version 1 (620) of an extension of the base bot may be compatible with version 1 (610), version 2 (612), and version 3 (614) of the base bot. However, at 622, when version 4 (616) of the base bot is published in the skills store, the management service application may determine that version 1 (620) of the extension to the base bot is incompatible with version 4 (616) of the base bot. In some embodiments, the infrastructure (e.g., the management service application) may execute validation tests defined by the extension to determine the compatibility or validity. In some embodiments, when incompatibility or invalidity is detected, the infrastructure may perform a best-effort attempt to automatically resolve compatibility issues at 624. In some embodiments, if a compatibility issue is not resolved, the infrastructure may fail or abort the upgrade, or may automatically disable the incompatible extension. In some embodiments, the infrastructure may provide feedback to clients/users about any issues it cannot resolve automatically, such that the clients or users may manually resolve the pending issues and publish a new version of the extension when needed. For example, a new version 2 (626) of the extension to the base bot that may be compatible with version 4 (616) of the base bot may be generated automatically or manually.

IV. Skill Extension GUI

In general, extending a published skill would be as seamless as creating a new bot version. As described above with respect to FIG. 5, a developer may use a GUI (e.g., GUI 534) to create and manage the extensions to base skills. One example of a GUI for bot extension is described below.

Figure 7:
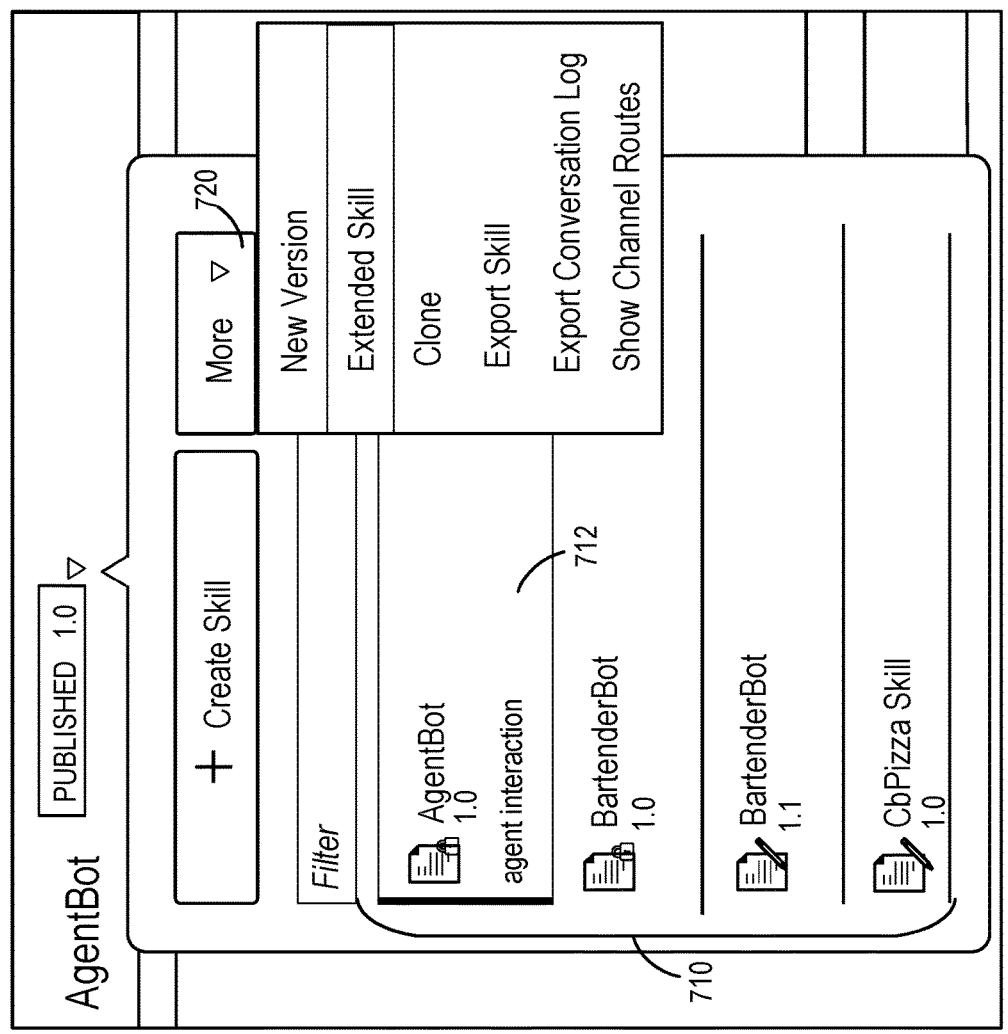
FIG. 7 illustrates an example of creating a new skill extension to a published skill using a graphic user interface (GUI) according to certain embodiments.

According to certain embodiments, a new skill extension can be created from a skill tile or from the context menu. FIG. 7 illustrates an example of creating a new skill extension to a published skill using a graphic user interface (GUI) 700 according to certain embodiments. In the illustrated example, a user may select a skill 712 from a list 710, and select operations to be applied to skill 712 from a pull-down menu 720. The operations may include, for example, create a new skill, create a new version of an existing skill, extend an existing skill, export a skill, and the like.

Figure 8:
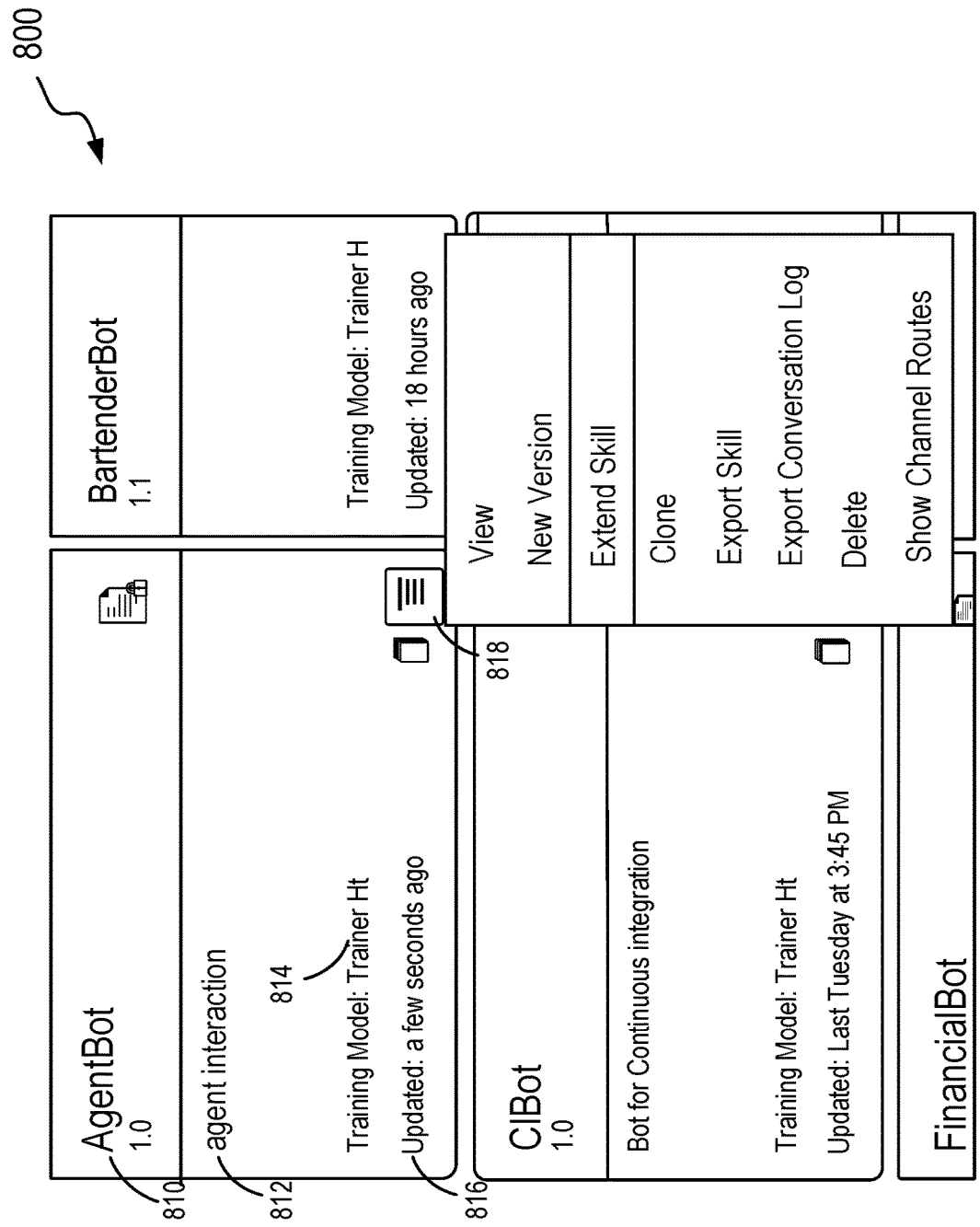
FIG. 8 illustrates an example of creating a new skill extension to a published skill using a context menu in a GUI according to certain embodiments.

FIG. 8 illustrates an example of creating a new skill extension to a published skill 810 using a context menu 818 in a GUI 800 according to certain embodiments. GUI 800 may show a list of skills in multiple tiles, where each tile may show certain information of a skill, such as a short description 812, the training model 814, and the update time 816 of skill 810. Context menu 818 may be used to select operations to be applied to skill 810, such as viewing the skill, creating a new version, extending the skill, exporting the skill, exporting the conversation log, deleting the skill, or the like.

FIG. 9 illustrates an example of a dialog in a GUI image 900 for creating an extended skill according to certain embodiments. GUI image 900 shows the name and version of the base skill (e.g., "Agent Bot 1.0") to be extended. As shown in FIG. 9, a developer may use the "Create Extend Skill" dialog to enter the display name, name, version, and a short description of the extended skill, where the values of the display name, name, version, and the short description of the chosen skill may be edited. However, not all properties may be edited in the extended skill. Some properties may not be modified once the extended skill is created.

Figure 10:
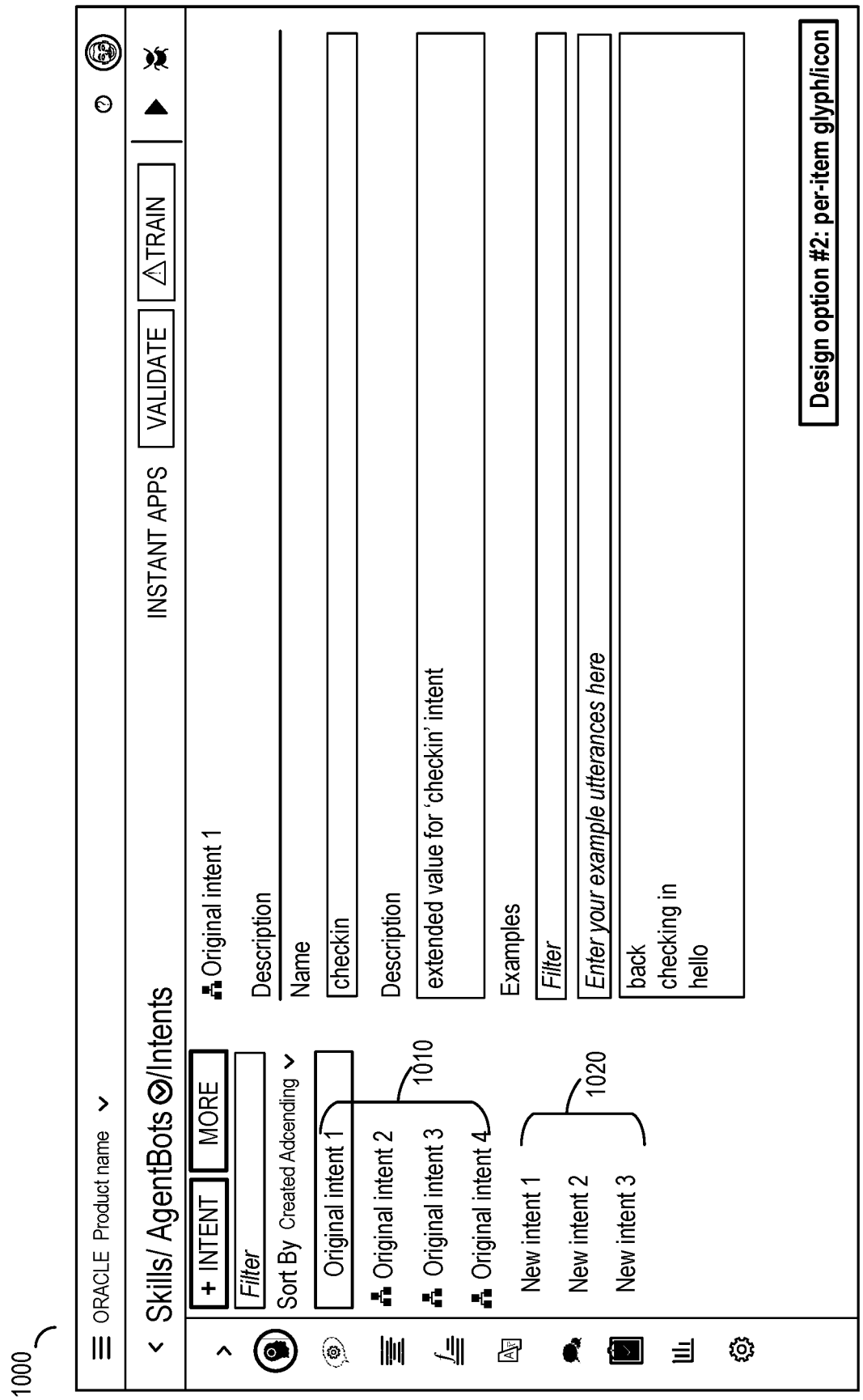
FIG. 10 illustrates an example of a GUI image showing certain inherited components of a base bot and new components of the extended bot according to certain embodiments.

FIG. 10 illustrates an example of a GUI image 1000 showing certain inherited components of a base bot and new components of the extended bot according to certain embodiments. The inherited items, such as original intents 1010 of the base bot, may not be deleted, but may be modified or customized. For example, the name, description, and example utterances for an original intent may be edited. The example utterances may be added, edited, or removed. New components, such as new intents 1020, may be added to the extended skill, and may be edited.

FIG. 11 illustrates an example of a GUI image 1100 showing form fields that can be added, edited, or removed for extending a skill according to certain embodiments. In the example shown in FIG. 10, the original intent 1 may be renamed to intent "check in" (1110). Utterances such as "back," "checking in, "hello" may be added to the examples of utterances for intent "check in." In some embodiments, properties in the UI that have been added or updated (e.g., the description of the "check in" intent) may be highlighted and users may have the option to roll back the property value to its original state.

Figure 12:
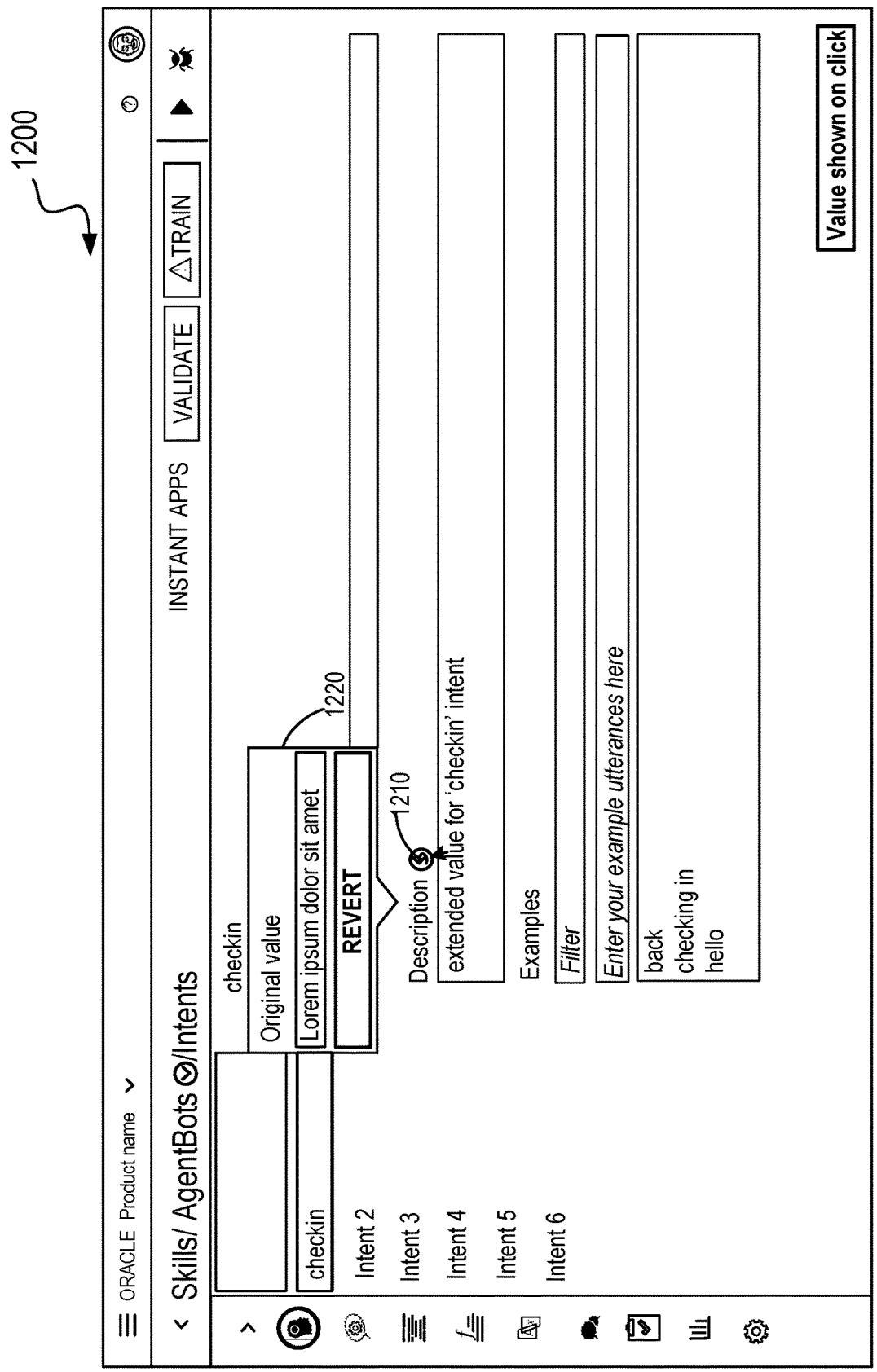
FIG. 12 illustrates an example of a GUI image showing a "revert" icon for reverting a value of a field for a skill to the original value according to certain embodiments.

FIG. 12 illustrates an example of a GUI image 1200 showing a "revert" icon 1210 for reverting a value of a field, such as the description of an intent, to the original value according to certain embodiments. By clicking on "revert" icon 1210, a dialog 1220 may be displayed with the original value of the field and the option to revert it to the original value.

Figure 13:
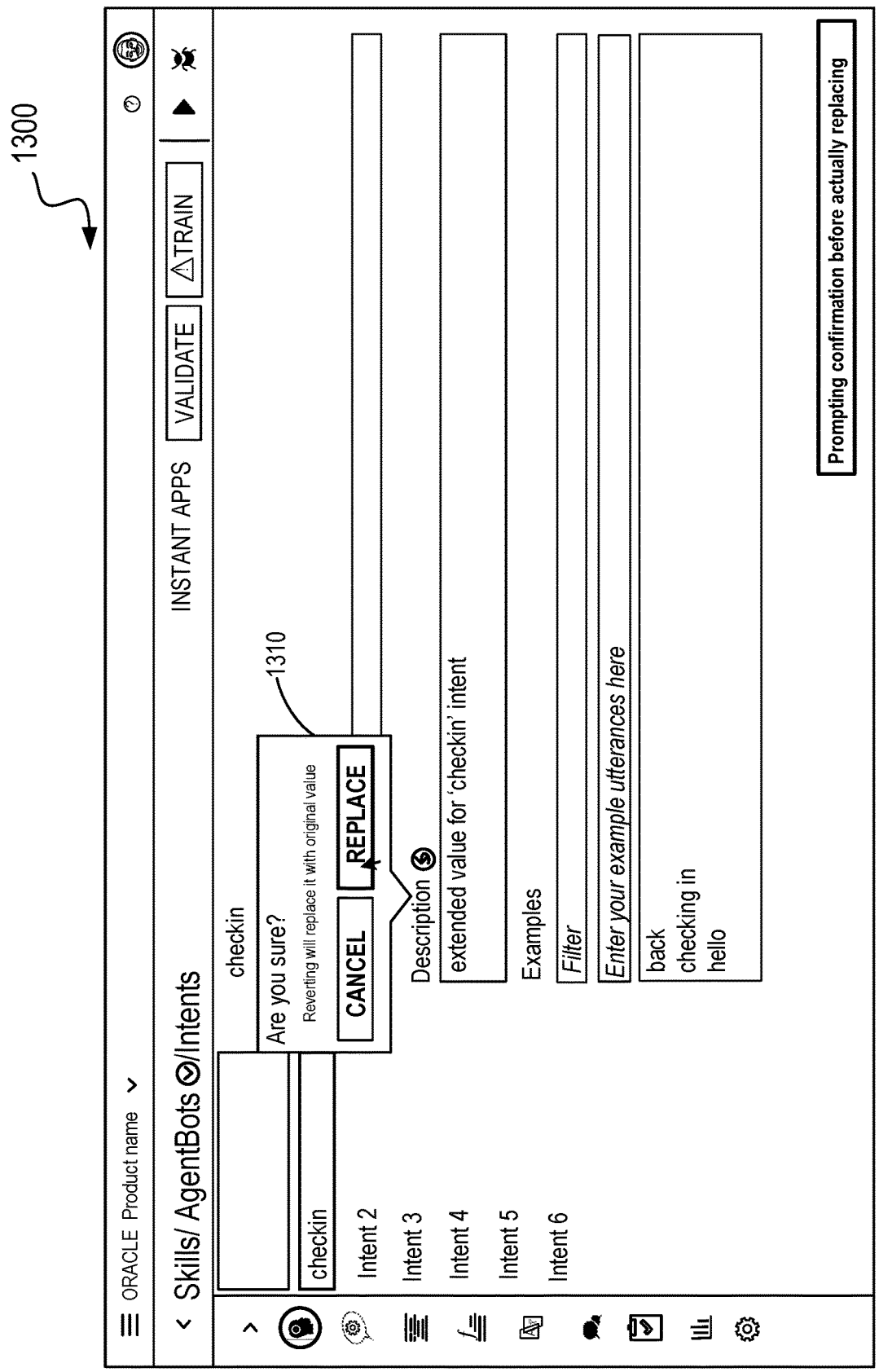
FIG. 13 illustrates an example of a GUI image showing a dialog for reverting a value of a field of a skill to the original value according to certain embodiments.

FIG. 13 illustrates an example of a GUI image 1300 showing a dialog 1310 for reverting a value of a field to the original value according to certain embodiments. Dialog 1310 may be displayed after a developer selected "revert" in dialog 1220. A developer may cancel the reverting or confirm the reverting using dialog 1310.

After a base skill is extended, the developer may compare the changes that has been made in the extension. A graphic user interface may be used to compare the metadata of the base skill and the metadata of the extended skills side by side before generating the bot extension that described the changes from the base skill to the extended skill.

Figure 14:
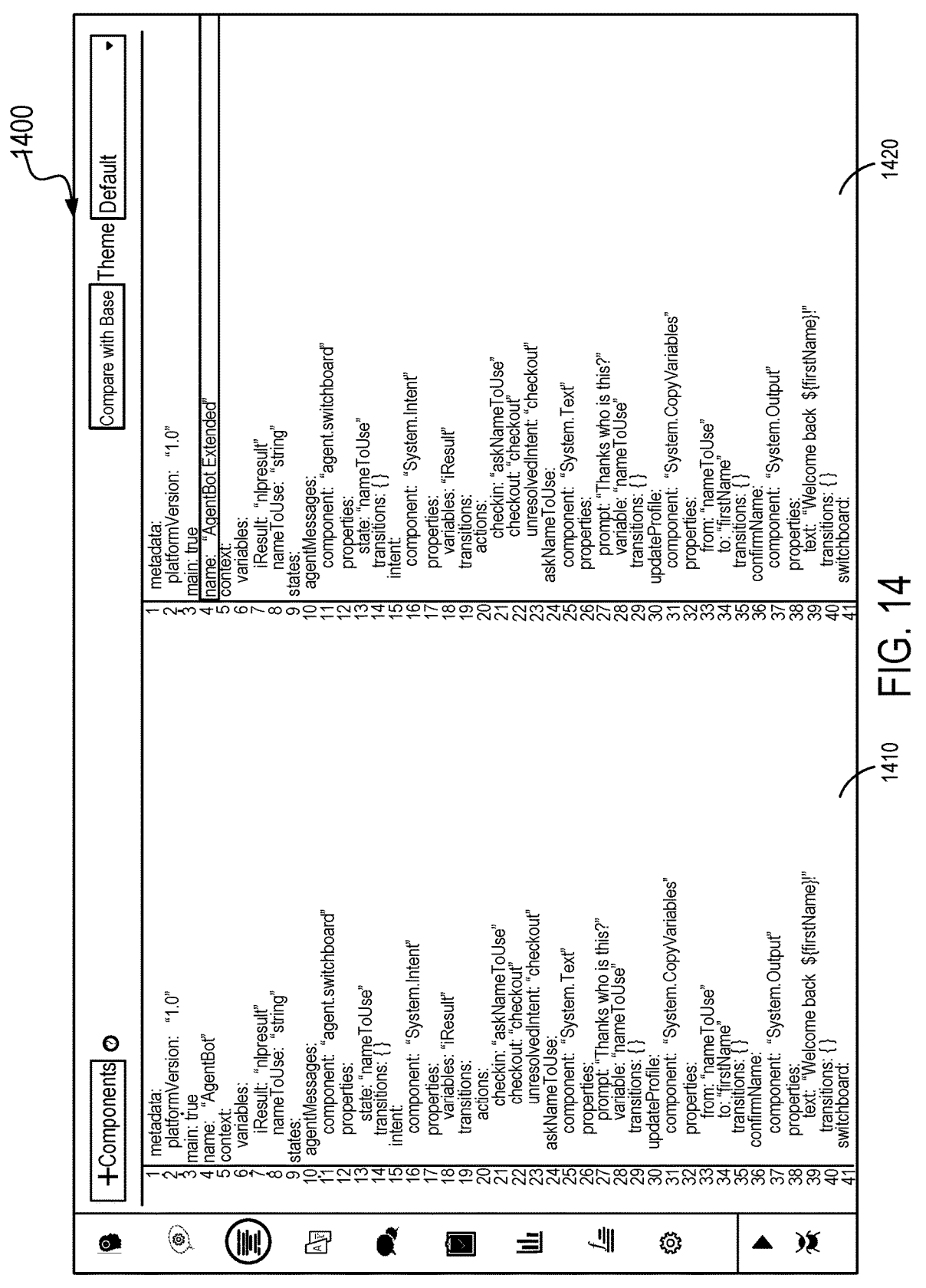

FIG. 14 illustrates an example of a GUI image 1400 showing comparison results between a based skill and an extended skill according to certain embodiments. In the illustrated example, a left window 1410 shows the metadata of a base skill "Agent bot," while a right window 1420 shows the metadata of an extended skill "Agent bot Extended." The developer may compare the metadata to determine the changes that has been made in the extension. In some embodiments, the comparison can be accomplished automatically using Code Mirror merge feature. The Code Mirror merge feature can be enabled or disabled by a "Compare with Base" button. As shown in FIG. 14, the differences or the changes made may be highlighted in right window 1420.

As described above, in some embodiments, an extension to a base skill may be rebased to a different version of the base skill. Rebase is the action re-applying the changes made in an extended skill on top of a new version of the base bot. For instance, a developer may have created an extended bot Pizza Bot 1.0 by extending Base Bot 1.0. After some time, a new Base Bot 1.1 is available with several bug fixes and the developer may want to make use of the new fixes in Base Bot 1.1. This may be accomplished by "rebasing" Pizza Bot 1.0 to Base Bot 1.1. When rebasing, a developer may choose the Base Bot target version if there is more than one possible version available. The latest base bot version may be selected as the target version by default.

Figure 15:
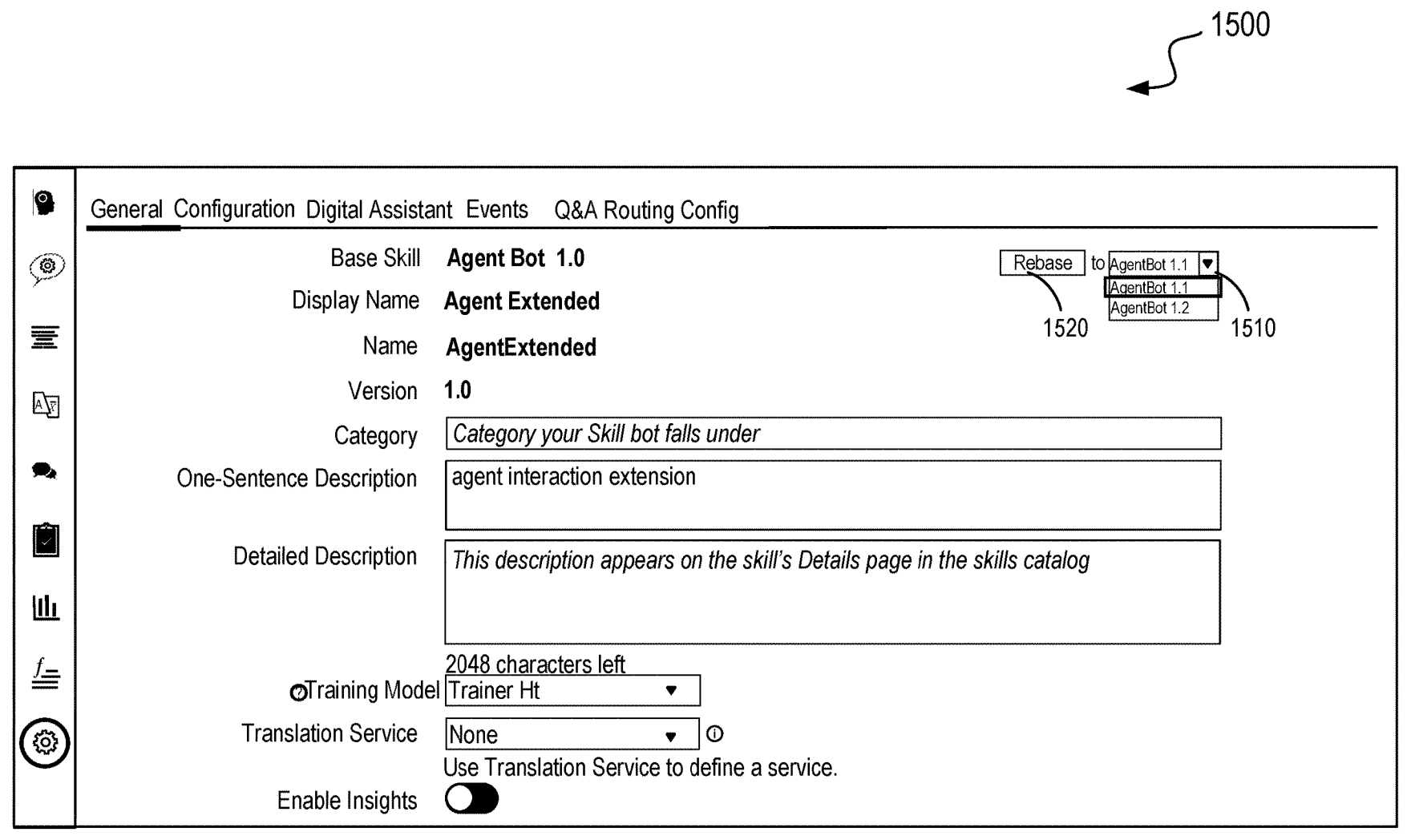

FIG. 15 illustrates an example of a GUI image 1500 showing a dialog for rebasing a skill extension according to certain embodiments. As shown in GUI image 1500, a user may want to rebase an extension (e.g., "Agent Extended," Version 1.0) to a base skill (e.g., "Agent Bot 1.0") to a newer version (e.g., "Agent Bot 1.1") of the base skill. The user can select the desired version from a menu 1510 and click a "rebase" button 1520. In some embodiments, if an extended skill is in the published state, the rebase action may force the developer to create a new extended skill version. If an extended skill is in the draft state, the extended skill may inherit all new features.

Figure 16:
FIG. 16 illustrates an example of a GUI image showing a dialog for creating a new version of a published extended skill according to certain embodiments.

FIG. 16 illustrates an example of a GUI image 1600 showing a dialog for creating a new version of a published extended skill (e.g., "Agent Bot Extended 1.0") according to certain embodiments. GUI image 1600 shows that the developer is asked to create a new skill version "Agent Bot Extended 1.1" for rebasing "Agent Bot Extended 1.0" to a new version of a base skill ("Agent Boy 1.1") because extended skill "Agent Bot Extended 1.0" may have been published already. Before consolidating the rebase action, a dialog may be presented to the developer to confirm the rebasing to a new version of the base skill.

Figure 17:
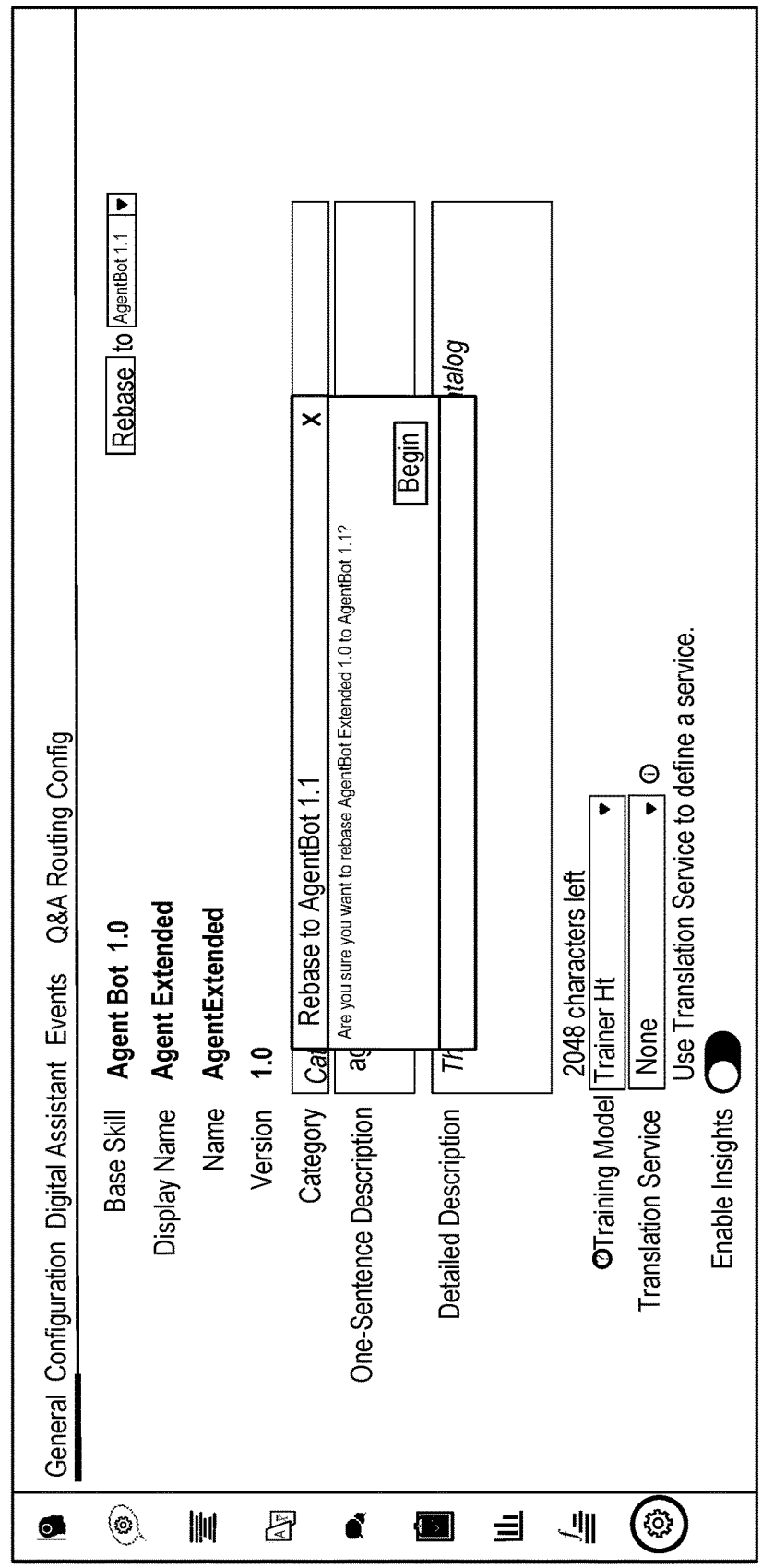
FIG. 17 illustrates an example of a GUI image showing a dialog for confirming the rebasing of a skill extension to a new version of a base skill according to certain embodiments.

FIG. 17 illustrates an example of a GUI image 1700 showing a dialog for confirming the rebasing of a skill extension to a new version of a base skill according to certain embodiments. In the example illustrated in FIG. 17, the developer may be asked to confirm that the developer wants to rebase extended skill "Agent Bot Extended 1.0" to a new version of a base skill ("Agent Boy 1.1").

Figure 18:
FIG. 18 illustrates an example of a GUI image presenting information regarding rebasing of a skill extension to a new version of a base skill according to certain embodiments.

FIG. 18 illustrates an example of a GUI image 1800 presenting information regarding rebasing of a skill extension to a new version of a base skill according to certain embodiments. The wizard-like dialog shown in FIG. 18 is to present information of the new base skill, such as "Agent Bot 1.1". The information of the new base skill may include, for example, a brief description, a detailed description, and some sample utterance. The developer may determine, based on the information of the new base skill, whether to proceed or go back. If the developer decides to proceed with the rebasing, a list of differences between the previous base skill and the new base skill may be presented to the developer.

Figure 19:
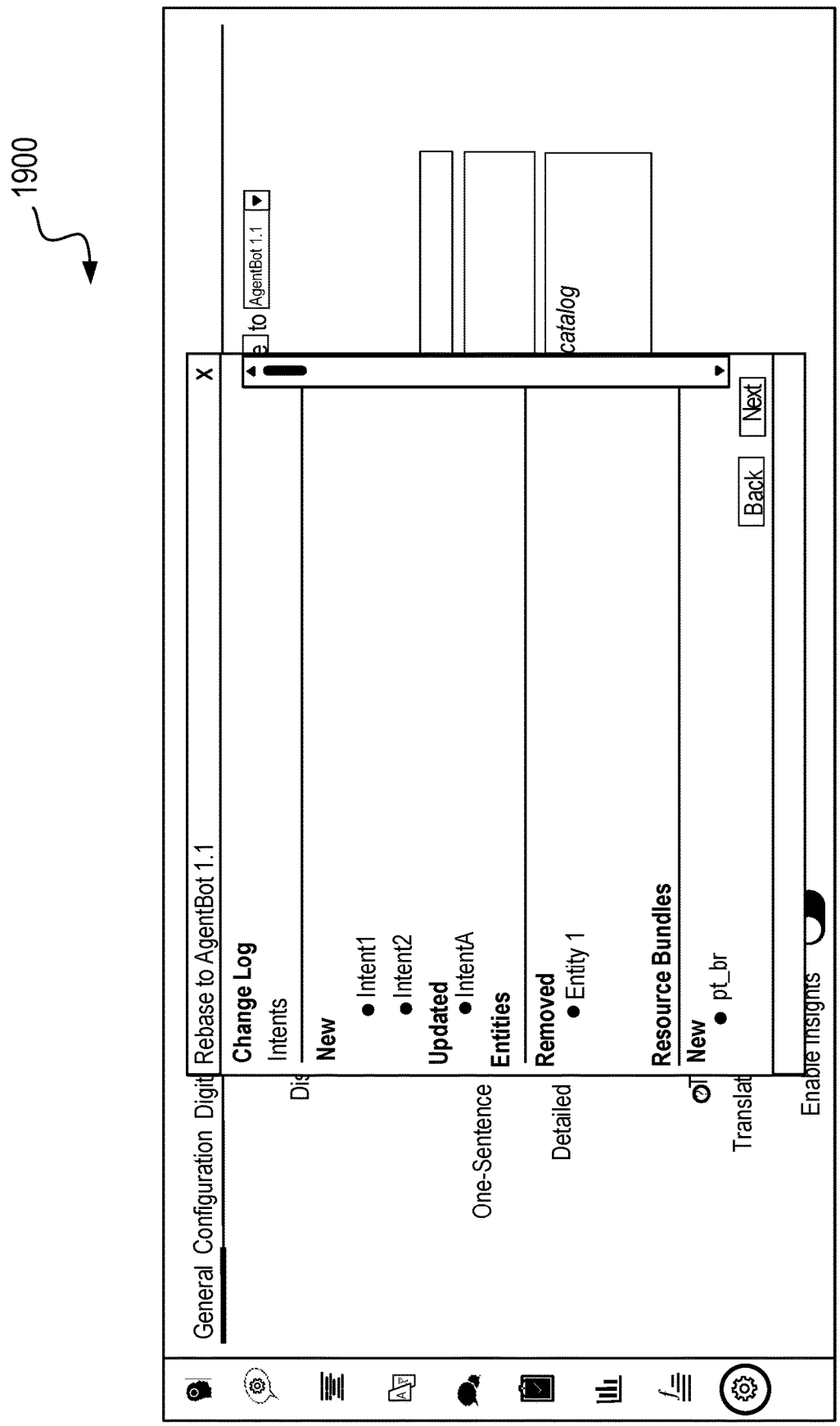
FIG. 19 illustrates an example of a GUI image showing a list of changes from a previous base skill to a new base skill according to certain embodiments.

FIG. 19 illustrates an example of a GUI image 1900 showing a list of changes from a previous base skill (e.g., "Agent Bot 1.0") to a new base skill (e.g., "Agent Bot 1.1") generated from the previous base skill according to certain embodiments. In the illustrated example, the new base skill (e.g., "Agent Bot 1.1") may include two new intents (e.g., "Intent 1" and "Intent 2") and an updated intent (e.g., "Intent A"). The new base skill may not include "Entity 1" that may be in the previous base skill. The developer may choose to proceed with the rebasing or go back. If the developer chooses to proceed with the rebasing, a GUI for comparing the differences among all skills involved in the rebase process may be presented to the developer.

Figure 20:
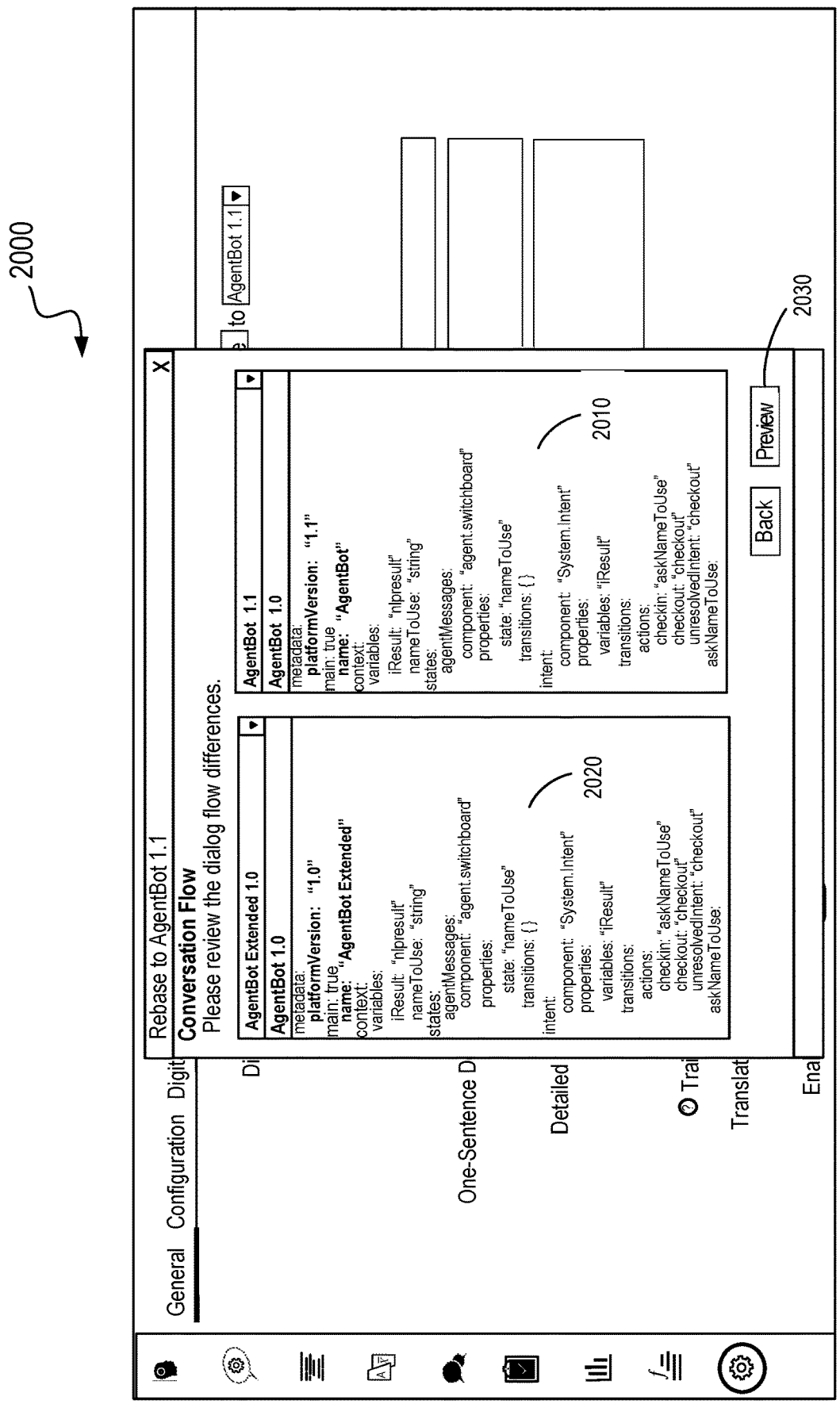
FIG. 20 illustrates an example of a GUI for comparing conversation flow contents involved in a rebase process according to certain embodiments.

FIG. 20 illustrates an example of a GUI image 2000 for comparing conversation flow contents among all skills involved in a rebase process according to certain embodiments. For example, a comparison between any two of the previous base skill (e.g., "Agent Bot 1.0"), new base skill (e.g., "Agent Bot 1.1"), previously extended skill (e.g., "Agent Bot Extended 1.0"), and the new extended skill (e.g., "Agent Bot Extended 1.1") may be performed using the GUI. The results of the comparison between the metadata of the new base skill (e.g., "Agent Bot 1.1" shown in a right window 2010) and the metadata of the previously extended skill (e.g., "Agent Bot Extended 1.0" shown in a left window 2020) are shown in FIG. 20. A "Preview" button 2030 may take the new extended skill into a transitory state, which may allow the developer to check all changes and run the necessary tests before applying the rebase action. If any changes are made to a skill while the skill is in the transitory state, the developer may be challenged with a dialog box asking the developer to create a new version. By clicking the "Cancel" button, the transitory state is lost and all changes are reverted to the previous skill state.

Figure 21:
FIG. 21 illustrates an example of a GUI image showing a dialog for confirming or canceling the rebasing of a skill extension according to certain embodiments.

FIG. 21 illustrates an example of a GUI image 2100 showing a dialog for confirming or canceling the rebasing of a skill extension according to certain embodiments. The developer may review information related to the rebasing and choose to confirm or cancel the rebasing.

In some embodiments, the skills may include custom components. The published skills may implement custom components of type "Embedded Container." Users may be able to edit metadata, such as the Name and Description, and/or replace the existing package file for the custom components. Undo operations may also be supported on the aforementioned fields.

Figure 22:
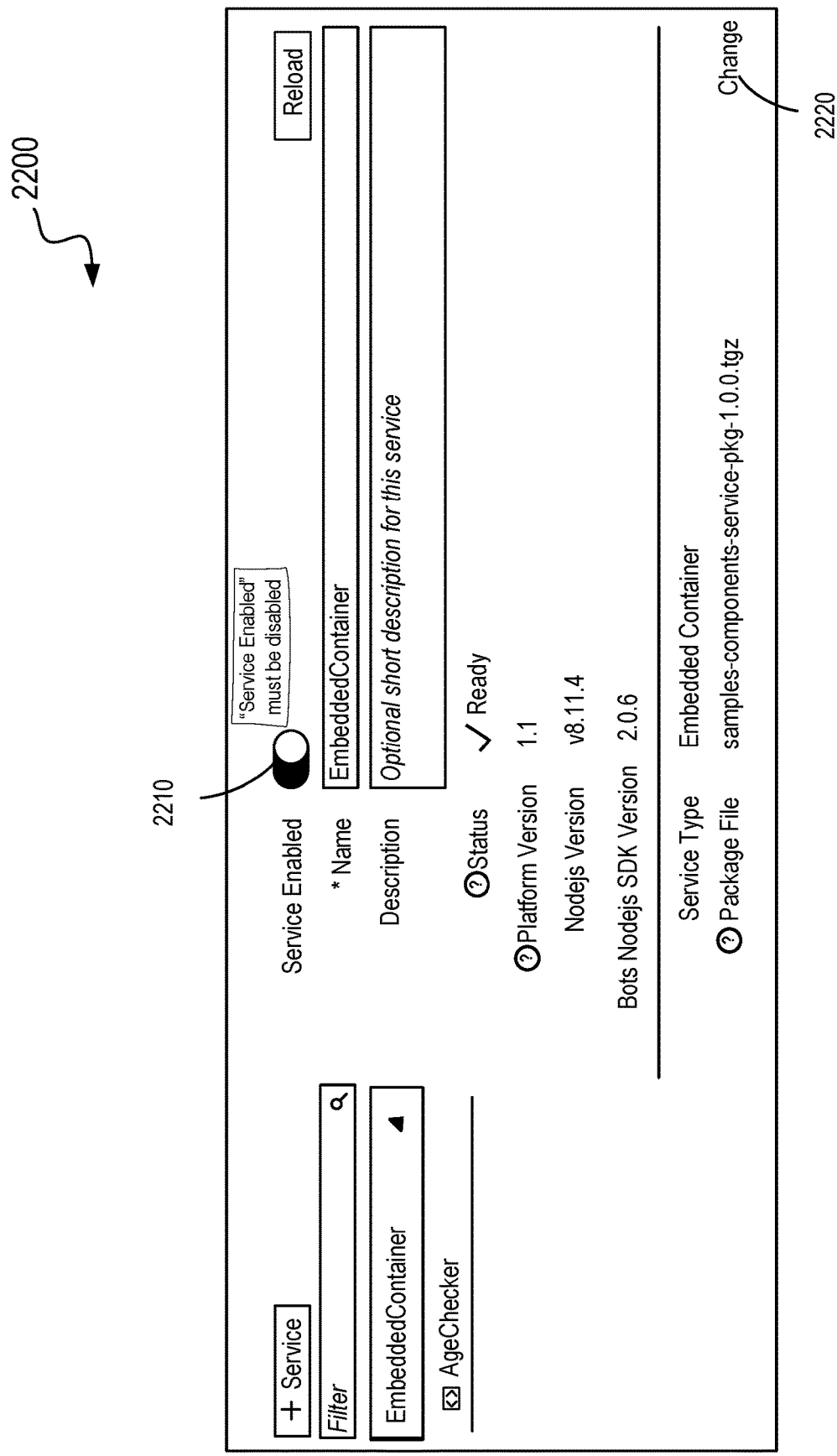
FIG. 22 illustrates an example of a GUI image showing an example of a custom component of a skill according to certain embodiments.

FIG. 22 illustrates an example of a GUI image 2200 showing an example of a custom component of type "Embedded Container" according to certain embodiments. GUI image 2200 may show, for example, the name, description, status, version, service type, package file, and the like of the "Embedded Container" component. The developer may be able to change the package file by selecting a button "change" 2220. In GUI image 2200, a "Service Enabled" switch 2210 may be disabled and a "Delete" button was omitted.

In some embodiments, a developer may also be able to add new services. FIG. 23 illustrates an example of a GUI image 2300 for creating a new service according to certain embodiments. The service may be an external service, an embedded container service, an Oracle Mobile Cloud service, or the like. The developer may specify the name, description, type, metadata location, verification information, and the like for the new service.

Figure 24:
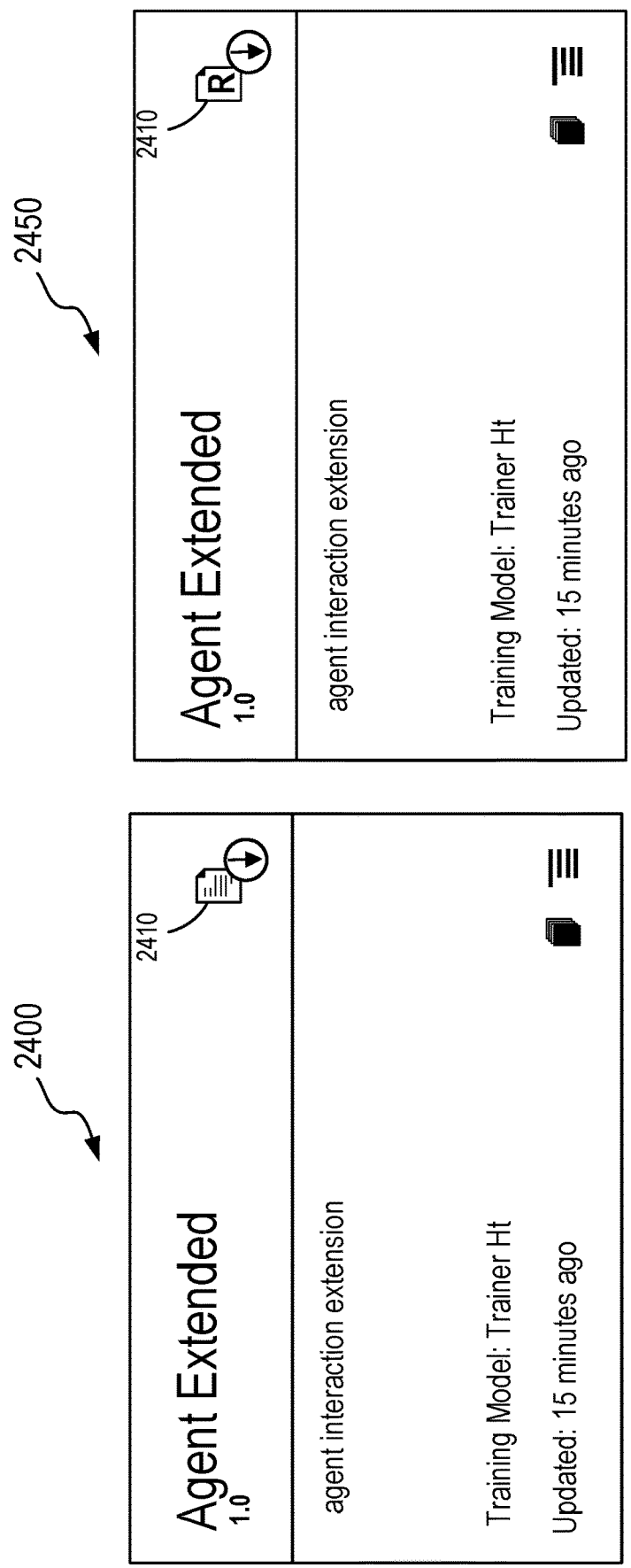
FIG. 24A illustrates an example of a GUI image including an icon indicating that a skill is an extended skill and a new base skill update is available according to certain embodiments.
FIG. 24B illustrates an example of a GUI image indicating an icon indicating that a skill is an extended skill and has a pending rebase according to certain embodiments.

In some embodiments, an icon may be used to inform that a skill is an extended skill and/or to signal whether a new base bot update is available. FIG. 24A illustrates an example of a GUI image 2400 including an icon 2410 indicating that a skill is an extended skill and a new base skill update is available according to certain embodiments. If a skill has a pending rebase, a different icon must be used. For example, FIG. 24B illustrates an example of a GUI image 2450 where icon 2410 indicates that a skill is an extended skill and has a pending rebase according to certain embodiments.

Figure 25:
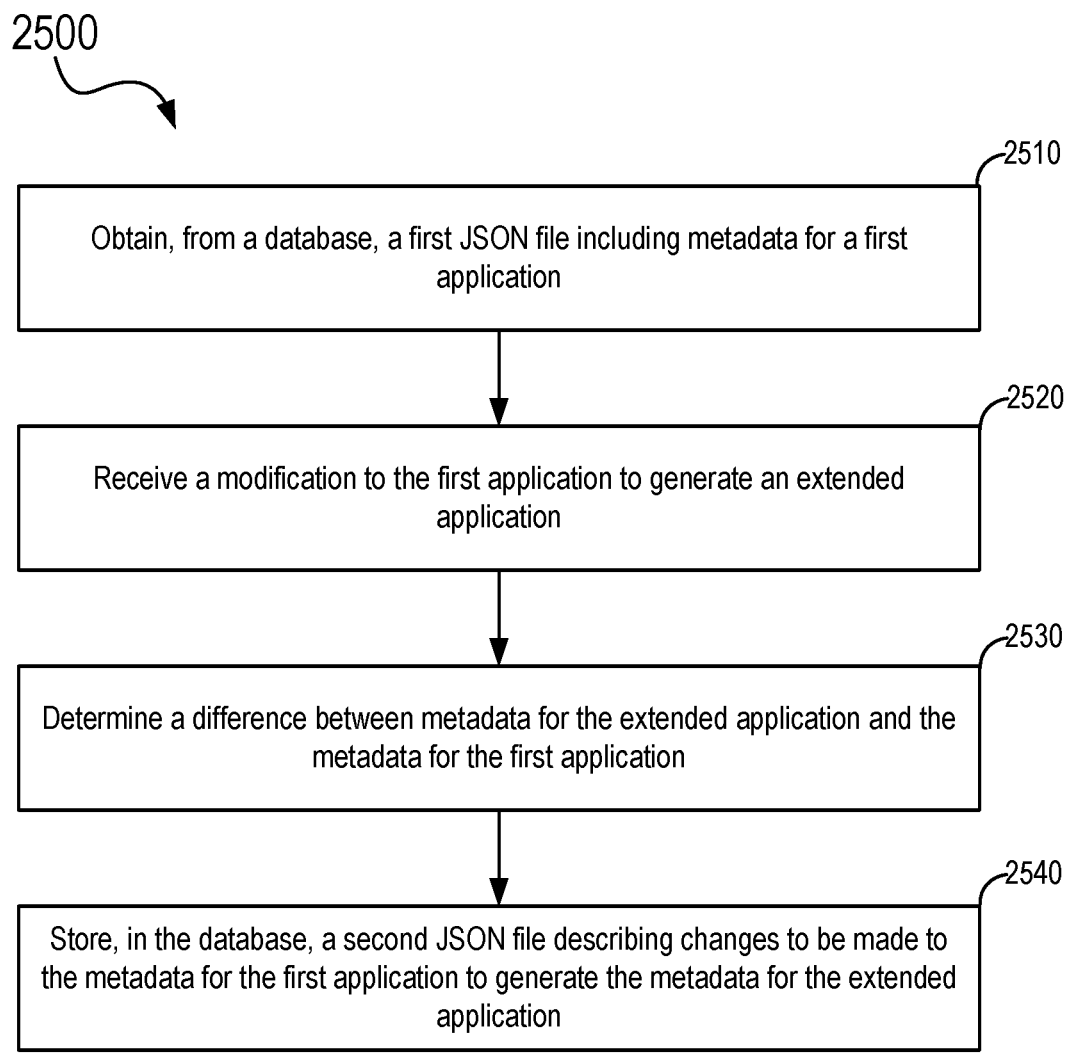
FIG. 25 is a simplified flowchart illustrating an example of a process for generating an extended skill according to certain embodiments.

FIG. 25 is a simplified flowchart 2500 illustrating an example of a process for generating an extended skill according to certain embodiments. At 2510, a computer system may obtain, from a database storing metadata in JSON files for a plurality of applications, a first JSON file including metadata for a first application. The plurality of applications may include chatbot applications. In some embodiments, the plurality of applications may be stored as compressed files in the database. In some embodiments, the plurality of applications may include two or more versions of the first application. In some embodiments, the metadata for the first application may include metadata for at least one of configuring, training, testing, or executing the first application. In some embodiments, the metadata for the first application may include metadata for at least one of an intent, an entity, an utterance, a custom component, or a conversation flow of the first application.

At 2520, the computer system may receive, for example, through a REST API, a modification to the first application to generate an extended application. The modification may include customizing and/or extending the first application in order to adjust it to specific features, processes, terminology, culture, and the like. The customization may include the alteration of one or more properties of existing metadata artifacts or resources of the first application. The extension may include the augmentation of existing metadata or addition of new artifacts or resources to the metadata of the first application.

At 2530, the computer system may determine a difference between the metadata for the extended application and the metadata for the first application. At 2540, the computer system may store, in the database, a second JSON file describing changes to be made to the metadata for the first application to generate the metadata for the extended application. In some embodiments, the second JSON file may be compatible with at least two versions of the first application for extending the at least two versions of the first application. In some embodiments, the second JSON file may be incompatible with at least one version in the two or more versions of the first application, and the database may include a third JSON file that is compatible with the at least one version in the two or more versions of the first application, where the second JSON file and the third JSON file may have different version numbers. In some embodiments, the second JSON file may include metadata for a custom component in the extended application.

Figure 26:
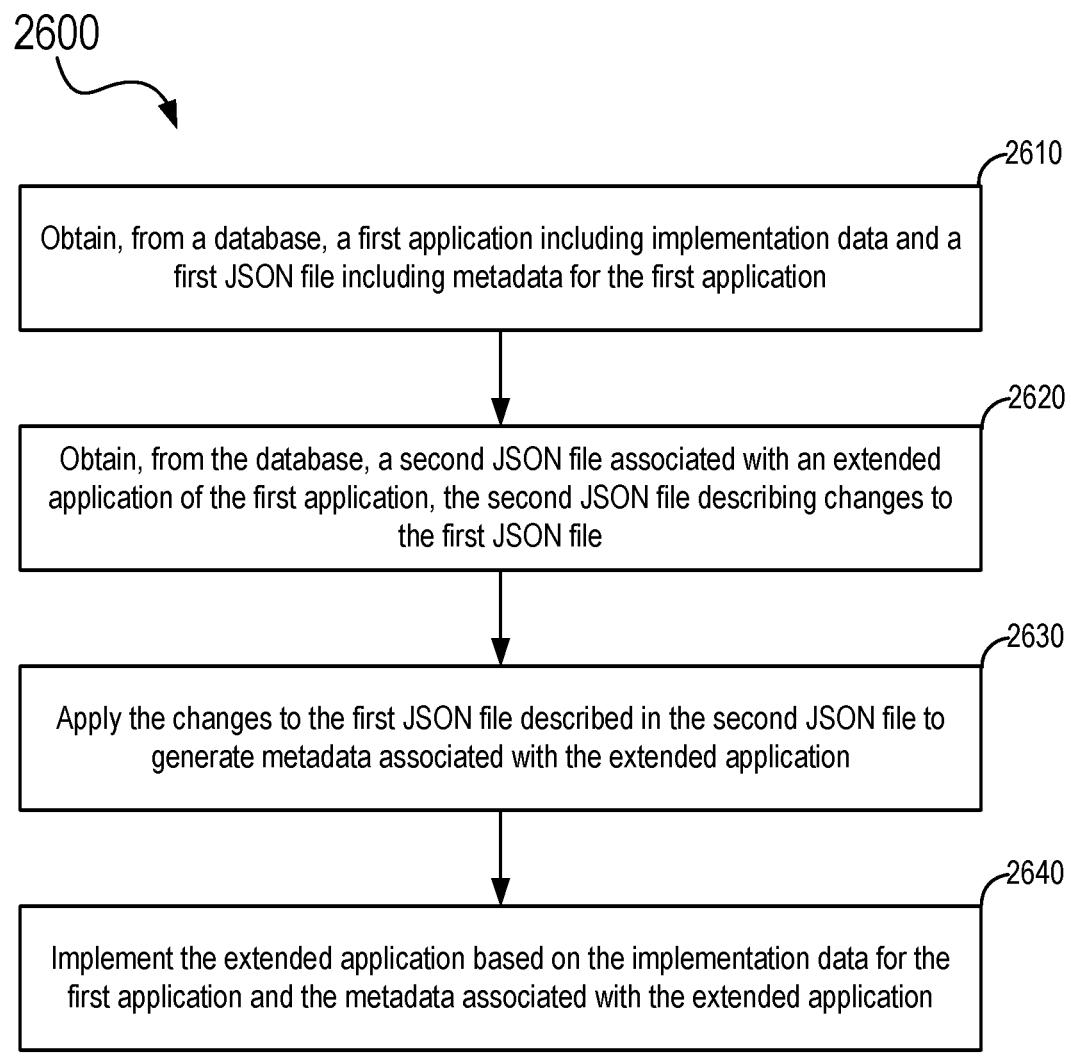
FIG. 26 is a simplified flowchart illustrating an example of a process for implementing an extended skill according to certain embodiments.

FIG. 26 is a simplified flowchart 2600 illustrating an example of a process for implementing an extended skill according to certain embodiments. At 2610, a computer system may obtain a first application from a database storing a plurality of applications. The first application may include implementation data for the first application and a first JSON file including metadata associated with the first application. The plurality of applications may include chatbot applications. The metadata associated with the first application may include metadata for at least one of configuring, training, testing, or executing the first application. The metadata associated with the first application may also include metadata for at least one of an intent, an entity, an utterance, a custom component, or a conversation flow of the first application.

At 2620, the computer system may obtain, from the database, a second JSON file associated with an extended application of the first application, where the second JSON file may describe changes to the first JSON file. In some embodiments, the database may include a first repository storing implementation data of the plurality of applications and a second repository storing the first JSON file and the second JSON file.

At 2630, the computer system may apply the changes to the first JSON file described in the second JSON file to generate metadata associated with the extended application. In some embodiments, applying the changes to the first JSON file described in the second JSON file may include determining that the second JSON file conflicts with the first JSON file, and resolving one or more conflicts between the second JSON file and the first JSON file.

At 2640, the computer system may implement the extended application based on the implementation data for the first application and the metadata associated with the extended application. In some embodiments, the computer system may also obtain, from the database, a third JSON file describing changes to the metadata associated with the extended application, apply the changes to the metadata associated with the extended application described in the third JSON file to generate metadata associated with a second extended application, and implement the second extended application based on the implementation data of the first application and the metadata associated with the second extended application. In some embodiments, the computer system may also obtain, from the database, a second application that includes implementation data for the second application and a third JSON file including metadata associated with the second application, apply the changes to the first JSON file described in the second JSON file to the third JSON file to generate metadata associated with a second extended application, and implementing the second extended application based on the implementation data for the second application and the metadata associated with the second extended application.

Although FIG. 25 and FIG. 26 may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. One or more processors may perform the associated tasks.

V. Examples of Systems

Figure 27:
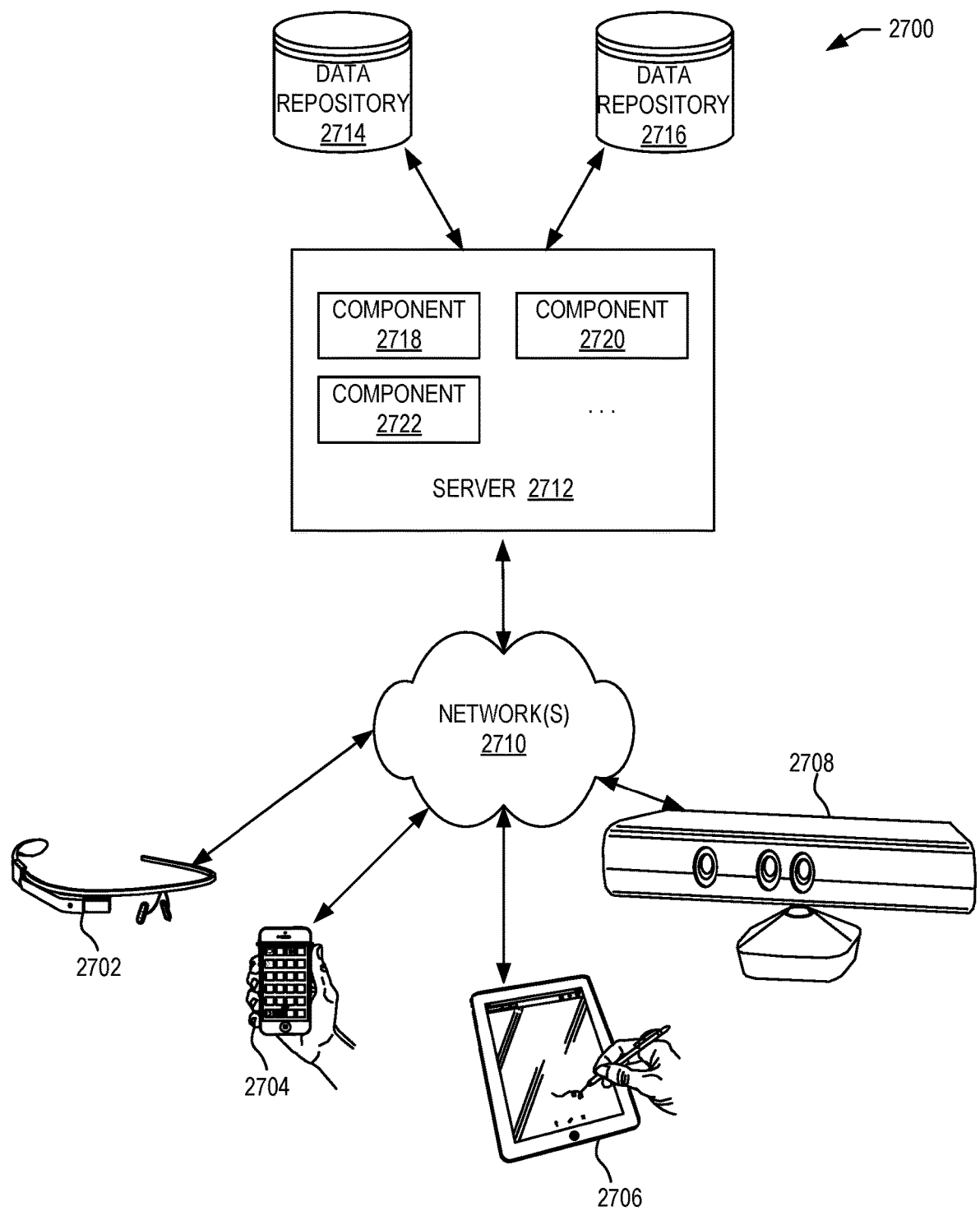
FIG. 27 depicts a simplified block diagram of an example of a distributed system for implementing some embodiments.

FIG. 27 depicts a simplified diagram of a distributed system 2700 for implementing some embodiments. In the illustrated example, distributed system 2700 includes one or more client computing devices 2702, 2704, 2706, and 2708, coupled to a server 2712 via one or more communication networks 2710. Clients computing devices 2702, 2704, 2706, and 2708 may be configured to execute one or more applications.

In various examples, server 2712 may be adapted to run one or more services or software applications that enable one or more embodiments described in this disclosure. In certain examples, server 2712 may also provide other services or software applications that may include non-virtual and virtual environments. In some examples, these services may be offered as web-based or cloud services, such as under a Software as a Service (SaaS) model to the users of client computing devices 2702, 2704, 2706, and/or 2708. Users operating client computing devices 2702, 2704, 2706, and/or 2708 may in turn utilize one or more client applications to interact with server 2712 to utilize the services provided by these components.

In the configuration depicted in FIG. 27, server 2712 may include one or more components 2718, 2720 and 2722 that implement the functions performed by server 2712. These components may include software components that may be executed by one or more processors, hardware components, or combinations thereof. It should be appreciated that various different system configurations are possible, which may be different from distributed system 2700. The example shown in FIG. 27 is thus one example of a distributed system for implementing an example system and is not intended to be limiting.

Users may use client computing devices 2702, 2704, 2706, and/or 2708 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 27 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Communication network(s) 2710 may be any type of network familiar to those skilled in the art that may support data communications using any of a variety of available protocols, including without limitation TCP/IP (transmission control protocol/Internet protocol), SNA (systems network architecture), IPX (Internet packet exchange), Apple-Talk®, and the like. Merely by way of example, communication network(s) 2710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 2712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2712 may include one or more virtual machines running virtual operating systems, or other computing architectures involving virtualization such as one or more flexible pools of logical storage devices that may be virtualized to maintain virtual storage devices for the server. In various examples, server 2712 may be adapted to run one or more services or software applications that provide the functionality described in the foregoing disclosure.

The computing systems in server 2712 may run one or more operating systems including any of those discussed above, as well as any commercially available server operating system. Server 2712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include, without limitation, those commercially available from Oracle®, Microsoft®, Sybase®, IBM® (International Business Machines), and the like.

In some implementations, server 2712 may include one or more applications to analyze and consolidate data feeds and/or event updates received from users of client computing devices 2702, 2704, 2706, and 2708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 2712 may also include one or more applications to display the data feeds and/or real-time events via one or more display devices of client computing devices 2702, 2704, 2706, and 2708.

Distributed system 2700 may also include one or more data repositories 2714, 2716. These data repositories may be used to store data and other information in certain examples. For example, one or more of the data repositories 2714, 2716 may be used to store information such as information related to storage virtual machines, information mapping application IDs to application to selected storage virtual machines, and other information used by server 2712 when performing authentication functions. Data repositories 2714, 2716 may reside in a variety of locations. For example, a data repository used by server 2712 may be local to server 2712 or may be remote from server 2712 and in communication with server 2712 via a network-based or dedicated connection. Data repositories 2714, 2716 may be of different types. In certain examples, a data repository used by server 2712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 2714, 2716 may also be used by applications to store application data. The data repositories used by applications may be of different types such as, for example, a key-value store repository, an object store repository, or a general storage repository supported by a file system.

Figure 28:
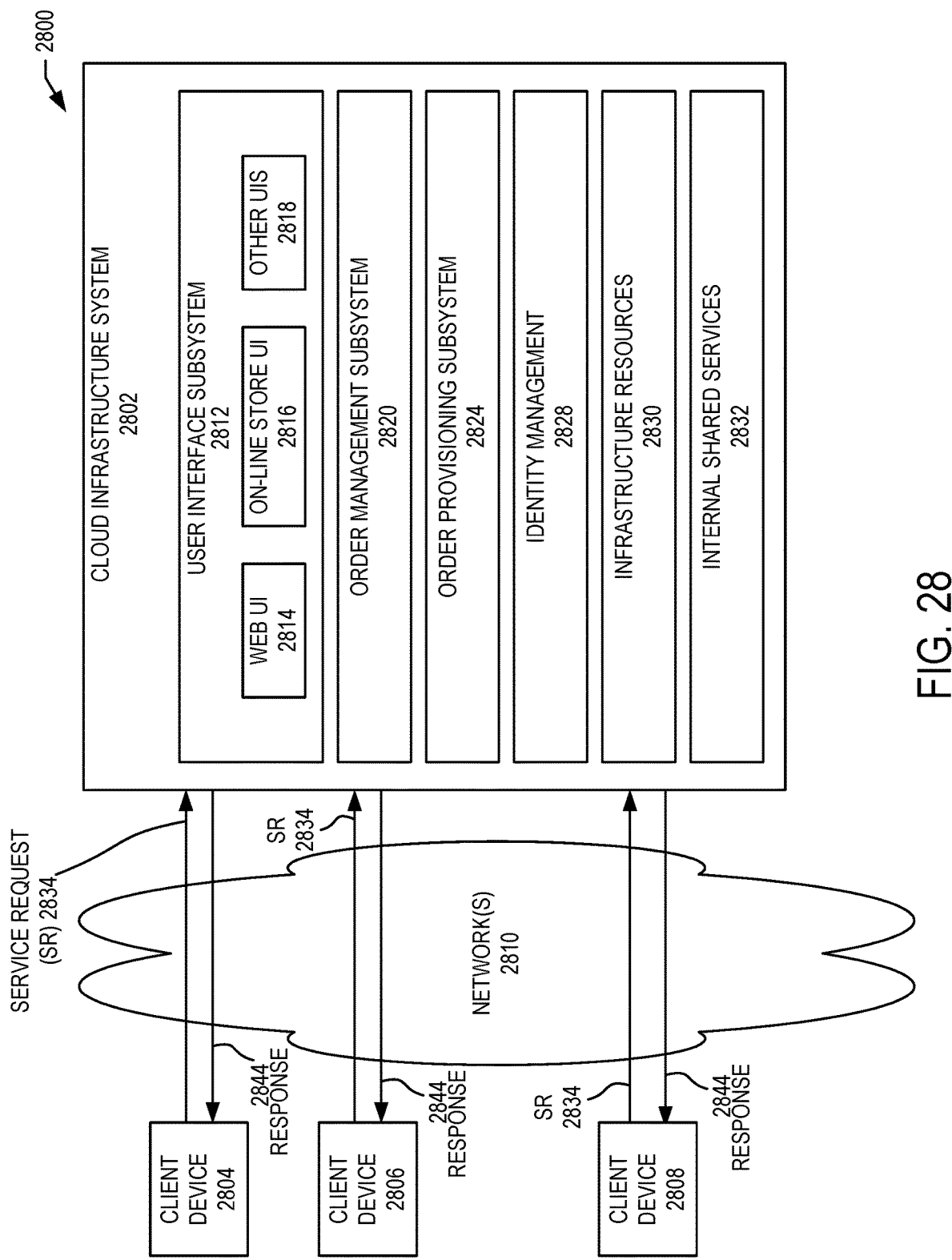
FIG. 28 is a simplified block diagram of an example of a cloud-based system environment for implementing some embodiments.

In certain examples, the functionalities described in this disclosure may be offered as services via a cloud environment. FIG. 28 is a simplified block diagram of a cloud-based system environment system 2800 for implementing some embodiments. In cloud-based system environment system 2800, various services may be offered as cloud services in accordance with certain examples. In the example depicted in FIG. 28, cloud infrastructure system 2802 may provide one or more cloud services that may be requested by users using one or more client computing devices 2804, 2806, and 2808. Cloud infrastructure system 2802 may comprise one or more computers and/or servers that may include those described above for server 1612. The computers in cloud infrastructure system 2802 may be organized as general purpose computers, specialized server computers, server farms, server clusters, or any other appropriate arrangement and/or combination.

Network(s) 2810 may facilitate communication and exchange of data between clients computing devices 2804, 2806, and 2808 and cloud infrastructure system 2802. Network(s) 2810 may include one or more networks. The networks may be of the same or different types. Network(s) 2810 may support one or more communication protocols, including wired and/or wireless protocols, for facilitating the communications.

The example depicted in FIG. 28 is only one example of a cloud infrastructure system and is not intended to be limiting. It should be appreciated that, in some other examples, cloud infrastructure system 2802 may have more or fewer components than those depicted in FIG. 28, may combine two or more components, or may have a different configuration or arrangement of components. For example, although FIG. 28 depicts three client computing devices, any number of client computing devices may be supported in alternative examples.

The term cloud service is generally used to refer to a service that is made available to users on demand and via a communication network such as the Internet by systems (e.g., cloud infrastructure system 2802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain examples, cloud infrastructure system 2802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2802. Cloud infrastructure system 2802 then performs processing to provide the services requested in the customer's subscription order. For example, a user may request the cloud infrastructure system to register an application, as described above, and provide services to the application per the application's specified requirements. Cloud infrastructure system 2802 may be configured to provide one or even multiple cloud services.

Cloud infrastructure system 2802 may provide the cloud services via different deployment models. In a public cloud model, cloud infrastructure system 2802 may be owned by a third party cloud services provider and the cloud services are offered to any general public customer, where the customer may be an individual or an enterprise. In certain other examples, under a private cloud model, cloud infrastructure system 2802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 2802 and the services provided may be shared by several organizations in a related community. Various other models such as hybrids of the above-mentioned models may also be used.

Client computing devices 2804, 2806, and 2808 may be of different types and may be capable of operating one or more client applications. A user may use a client device to interact with cloud infrastructure system 2802, such as to request a service provided by cloud infrastructure system 2802. For example, a user may use a client device to request an authentication-related service described in this disclosure.

In some examples, the processing performed by cloud infrastructure system 2802 for providing services may involve big data analysis. This analysis may involve using, analyzing, and manipulating large data sets to detect and visualize various trends, behaviors, relationships, etc., within the data. This analysis may be performed by one or more processors, possibly processing the data in parallel, performing simulations using the data, and the like. For example, big data analysis may be performed by cloud infrastructure system 2802 for determining which storage virtual machine is to be selected for a particular application based upon the application's stated authentication-related requirements. The data used for this analysis may include structured data (e.g., data stored in a database or structured according to a structured model) and/or unstructured data (e.g., data blobs (binary large objects)).

As depicted in the example in FIG. 28, cloud infrastructure system 2802 may include infrastructure resources 2830 that are utilized for facilitating the provision of various cloud services offered by cloud infrastructure system 2802. Infrastructure resources 2830 may include, for example, processing resources, storage or memory resources, networking resources, and the like. In certain examples, the storage virtual machines that are available for servicing storage requested from applications may be part of cloud infrastructure system 2802. In other examples, the storage virtual machines may be part of different systems.

In certain examples, to facilitate efficient provisioning of these resources for supporting the various cloud services provided by cloud infrastructure system 2802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2802 may itself internally use services 2832 that are shared by different components of cloud infrastructure system 2802 and which facilitate the provisioning of services by cloud infrastructure system 2802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2802 may comprise multiple subsystems. These subsystems may be implemented in software, or hardware, or combinations thereof. As depicted in FIG. 28, the subsystems may include a user interface subsystem 2812 that enables users or customers of cloud infrastructure system 2802 to interact with cloud infrastructure system 2802. User interface subsystem 2812 may include various different interfaces such as a web interface 2814, an online store interface 2816 where cloud services provided by cloud infrastructure system 2802 are advertised and are purchasable by a consumer, and other interfaces 2818. For example, a customer may, using a client device, request (service request 2834) one or more services provided by cloud infrastructure system 2802 using one or more of interfaces 2814, 2816, and 2818. For example, a customer may access the online store, browse cloud services offered by cloud infrastructure system 2802, and place a subscription order for one or more services offered by cloud infrastructure system 2802 that the customer wishes to subscribe to. The service request may include information identifying the customer and one or more services that the customer desires to subscribe to. For example, a customer may place a subscription order for a service offered by cloud infrastructure system 2802. As part of the order, the customer may provide information identifying an application for which the service is to be provided and the one or more credentials for the application.

In certain examples, such as the example depicted in FIG. 28, cloud infrastructure system 2802 may comprise an order management subsystem (OMS) 2820 that is configured to process the new order. As part of this processing, OMS 2820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2820 may then invoke the order provisioning subsystem (OPS) 2824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 2802 as part of the provisioning process. Cloud infrastructure system 2802 may generate an application ID and select a storage virtual machine for an application from among storage virtual machines provided by cloud infrastructure system 2802 itself or from storage virtual machines provided by other systems other than cloud infrastructure system 2802.

Cloud infrastructure system 2802 may send a response or notification 2844 to the requesting customer to indicate when the requested service is now ready for use. In some instances, information (e.g., a link) may be sent to the customer that enables the customer to start using and availing the benefits of the requested services. In certain examples, for a customer requesting the service, the response may include an application ID generated by cloud infrastructure system 2802 and information identifying a virtual machine selected by cloud infrastructure system 2802 for an application corresponding to the application ID.

Cloud infrastructure system 2802 may provide services to multiple customers. For each customer, cloud infrastructure system 2802 is responsible for managing information related to one or more subscription orders received from the customer, maintaining customer data related to the orders, and providing the requested services to the customer. Cloud infrastructure system 2802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2802 may provide services to multiple customers in parallel. Cloud infrastructure system 2802 may store information for these customers, including possibly proprietary information. In certain examples, cloud infrastructure system 2802 comprises an identity management subsystem (IMS) 2828 that is configured to manage customer information and provide the separation of the managed information such that information related to one customer is not accessible by another customer. IMS 2828 may be configured to provide various security-related services such as identity services, which may include, for example, information access management, authentication and authorization services, services for managing customer identities and roles and related capabilities, and the like.

Figure 29:
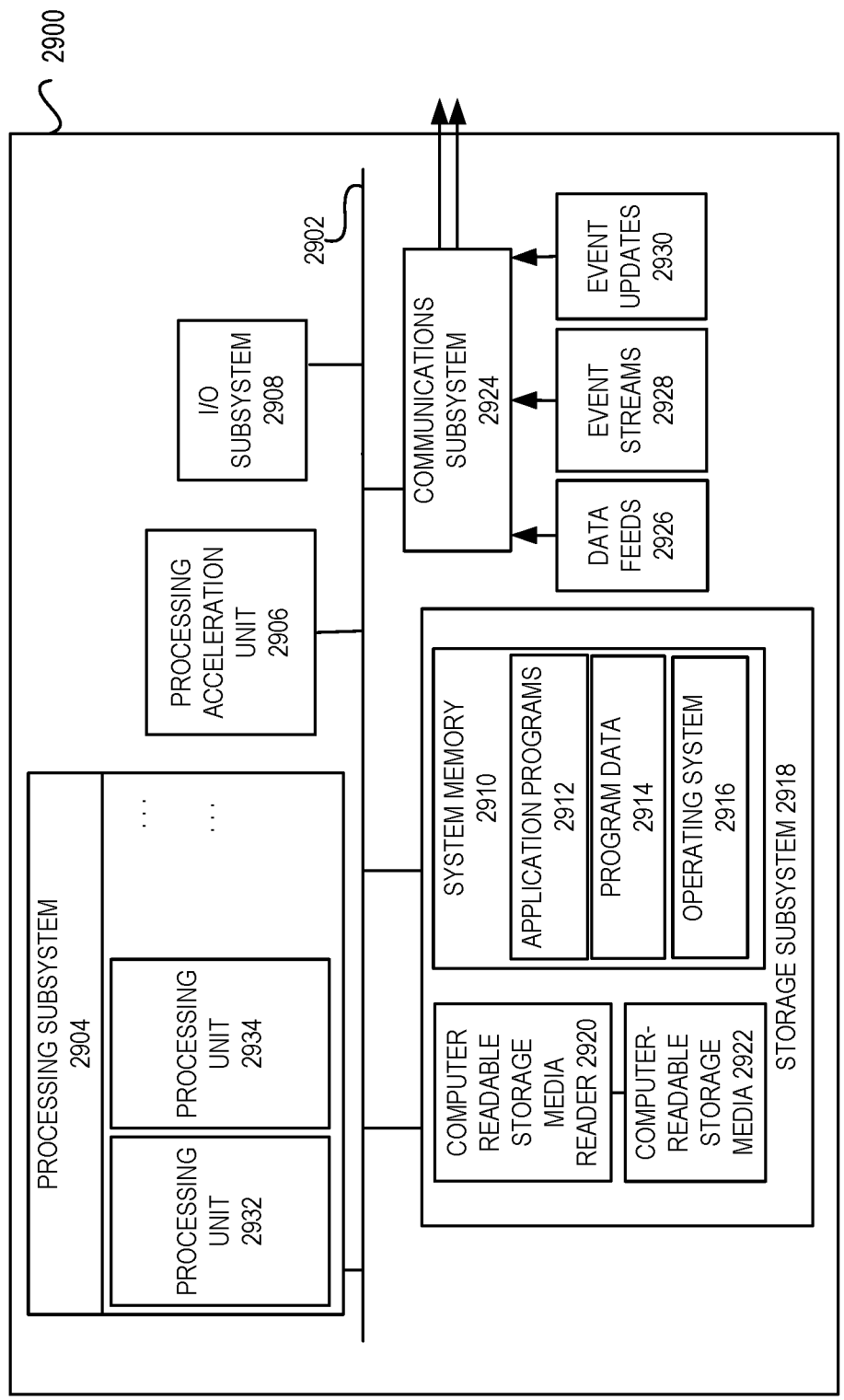
FIG. 29 illustrates an example of a computer system for implementing some embodiments.

FIG. 29 illustrates an example of computer system 2900 for implementing some embodiments. In some examples, computer system 2900 may be used to implement any of the application system, access management system, systems within a data center, and various servers and computer systems described above. As shown in FIG. 29, computer system 2900 includes various subsystems, including a processing subsystem 2904 that communicates with a number of other subsystems via a bus subsystem 2902. These other subsystems may include a processing acceleration unit 2906, an I/O subsystem 2908, a storage subsystem 2918, and a communications subsystem 2924. Storage subsystem 2918 may include non-transitory computer-readable storage media including computer-readable storage media 2922 and a system memory 2910.

Bus subsystem 2902 provides a mechanism for letting the various components and subsystems of computer system 2900 communicate with each other as intended. Although bus subsystem 2902 is shown schematically as a single bus, alternative examples of the bus subsystem may utilize multiple buses. Bus subsystem 2902 may be any of several types of bus structures, including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 2904 controls the operation of computer system 2900 and may comprise one or more processors, application specific integrated circuits (ASICs), or field programmable gate arrays (FPGAs). The processors may include single core or multicore processors. The processing resources of computer system 2900 may be organized into one or more processing units 2932, 2934, etc. A processing unit may include one or more processors, one or more cores from the same or different processors, a combination of cores and processors, or other combinations of cores and processors. In some examples, processing subsystem 2904 may include one or more special purpose co-processors such as graphics processors, digital signal processors (DSPs), or the like. In some examples, some or all of the processing units of processing subsystem 2904 may be implemented using customized circuits, such as application specific integrated circuits (ASICs), or field programmable gate arrays (FPGAs).

In some examples, the processing units in processing subsystem 2904 may execute instructions stored in system memory 2910 or on computer-readable storage media 2922. In various examples, the processing units may execute a variety of programs or code instructions and may maintain multiple concurrently executing programs or processes. At any given time, some or all of the program code to be executed may be resident in system memory 2910 and/or on computer-readable storage media 2922, including potentially on one or more storage devices. Through suitable programming, processing subsystem 2904 may provide various functionalities described above. In instances where computer system 2900 is executing one or more virtual machines, one or more processing units may be allocated to each virtual machine.

In certain examples, a processing acceleration unit 2906 may optionally be provided for performing customized processing or for off-loading some of the processing performed by processing subsystem 2904 so as to accelerate the overall processing performed by computer system 2900.

I/O subsystem 2908 may include devices and mechanisms for inputting information to computer system 2900 and/or for outputting information from or via computer system 2900. In general, use of the term input device is intended to include all possible types of devices and mechanisms for inputting information to computer system 2900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 240 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader, 3D scanners, 3D printers, laser rangefinders, and eye-gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2918 provides a repository or data store for storing information and data that is used by computer system 2900. Storage subsystem 2918 provides a tangible non-transitory computer-readable storage medium for storing the basic programming and data constructs that provide the functionality of some examples. Storage subsystem 2918 may store software (e.g., programs, code modules, instructions) that when executed by processing subsystem 2904 provides the functionality described above. The software may be executed by one or more processing units of processing subsystem 2904. Storage subsystem 2918 may also provide authentication in accordance with the teachings of this disclosure.

Storage subsystem 2918 may include one or more non-transitory memory devices, including volatile and non-volatile memory devices. As shown in FIG. 29, storage subsystem 2918 includes a system memory 2910 and a computer-readable storage media 2922. System memory 2910 may include a number of memories, including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2900, such as during start-up, may typically be stored in the ROM. The RAM typically contains data and/or program modules that are presently being operated and executed by processing subsystem 2904. In some implementations, system memory 2910 may include multiple different types of memory, such as static random access memory (SRAM), dynamic random access memory (DRAM), and the like.

By way of example, and not limitation, as depicted in FIG. 29, system memory 2910 may load application programs 2912 that are being executed, which may include various applications such as Web browsers, mid-tier applications, relational database management systems (RDBMS), etc., program data 2914, and an operating system 2916. By way of example, operating system 2916 may include various versions of Microsoft Windows®, Apple Macintosh®, and/or Linux operating systems, a variety of commercially-available UNIX® or UNIX-like operating systems (including, without limitation, the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2922 may store programming and data constructs that provide the functionality of some examples. Computer-readable storage media 2922 may provide storage of computer-readable instructions, data structures, program modules, and other data for computer system 2900. Software (programs, code modules, instructions) that, when executed by processing subsystem 2904 provides the functionality described above, may be stored in storage subsystem 2918. By way of example, computer-readable storage media 2922 may include non-volatile memory such as a hard disk drive, a magnetic disk drive, an optical disk drive such as a CD ROM, DVD, a Blu-Ray® disk, or other optical media. Computer-readable storage media 2922 may include, but is not limited to, Zip® drives, flash memory cards, universal serial bus (USB) flash drives, secure digital (SD) cards, DVD disks, digital video tape, and the like. Computer-readable storage media 2922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 2918 may also include a computer-readable storage media reader 2920 that may further be connected to computer-readable storage media 2922. Reader 2920 may receive and be configured to read data from a memory device such as a disk, a flash drive, etc.

In certain examples, computer system 2900 may support virtualization technologies, including, but not limited to, virtualization of processing and memory resources. For example, computer system 2900 may provide support for executing one or more virtual machines. In certain examples, computer system 2900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2900. Accordingly, multiple operating systems may potentially be run concurrently by computer system 2900.

Communications subsystem 2924 provides an interface to other computer systems and networks. Communications subsystem 2924 serves as an interface for receiving data from and transmitting data to other systems from computer system 2900. For example, communications subsystem 2924 may enable computer system 2900 to establish a communication channel to one or more client devices via the Internet for receiving and/or sending information from and/or to the client devices. For example, when computer system 2900 is used to implement bot system 120 depicted in FIG. 1, the communication subsystem may be used to communicate with an application system and also a system executing a storage virtual machine selected for an application.

Communication subsystem 2924 may support both wired and/or wireless communication protocols. In certain examples, communications subsystem 2924 may include radio frequency (RF) transceiver components for accessing wireless voice and/or data networks (e.g., using cellular telephone technology, advanced data network technology, such as 3G, 4G, EDGE (enhanced data rates for global evolution), or 5G, WiFi (IEEE 802.XX family standards, or other mobile communication technologies, or any combination thereof), global positioning system (GPS) receiver components, and/or other components. In some examples, communications subsystem 2924 may provide wired network connectivity (e.g., Ethernet) in addition to or instead of a wireless interface.

Communication subsystem 2924 may receive and transmit data in various forms. In some examples, in addition to other forms, communications subsystem 2924 may receive input communications in the form of structured and/or unstructured data feeds 2926, event streams 2928, event updates 2930, and the like. For example, communications subsystem 2924 may be configured to receive (or send) data feeds 2926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 2924 may be configured to receive data in the form of continuous data streams, which may include event streams 2928 of real-time events and/or event updates 2930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2924 may also be configured to communicate data from computer system 2900 to other computer systems or networks. The data may be communicated in various different forms such as structured and/or unstructured data feeds 2926, event streams 2928, event updates 2930, and the like to one or more databases that may be in communication with one or more streaming data source computers coupled to computer system 2900.

Computer system 2900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 2900 depicted in FIG. 29 is intended only as a specific example. Many other configurations having more or fewer components than the system depicted in FIG. 29 are possible. Based on the disclosure and teachings provided herein, a person of ordinary skill in the art will appreciate other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including, but not limited to, conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
obtaining, from a database storing metadata in JavaScript Object Notation (JSON) files for a plurality of skills, a first JSON file including metadata for a base skill;
receiving, via an application programming interface (API), a modification to the base skill to generate an extended skill, wherein the modification includes an alteration to existing metadata artifacts or resources of the base skill, and wherein the metadata artifacts or resources are a top-level skill definition, an intent, an entity, an utterance, a custom component, conversation flow, a resource bundle, or a combination thereof, associated with the base skill;

determining a difference between metadata for the extended skill and the metadata for the base skill based on the alteration to the metadata artifacts or resources of the base skill;

generating a second JSON file describing changes to be made to the metadata for the base skill to generate the metadata for the extended skill based on the difference between the metadata for the base skill and the metadata for the extended skill, wherein the second JSON file represents only the difference between the metadata for the base skill and the metadata for the extended skill;

storing, in the database, the second JSON file separately from the first JSON file;

modifying, using the first JSON file and the second JSON file, the metadata for the base skill by applying the changes described in the second JSON file to be made to the metadata for the base skill to generate the metadata for the extended skill; and implementing the extended skill based on implementation data for the base skill and the metadata generated for the extended skill.

2. The computer-implemented method of claim 1, wherein the plurality of skills are chatbot applications.

3. The computer-implemented method of claim 1, wherein the JSON files for the plurality of skills are stored as compressed files in the database.

4. The computer-implemented method of claim 1, wherein the plurality of skills include two or more versions of the base skill.

5. The computer-implemented method of claim 4, wherein the second JSON file is compatible with at least two versions of the base skill for extending the at least two versions of the base skill.

6. The computer-implemented method of claim 4, wherein:
the second JSON file is incompatible with at least one version in the two or more versions of the base skill; and
the database includes a third JSON file that is compatible with the at least one version in the two or more versions of the base skill, wherein the second JSON file and the third JSON file have different version numbers.

7. The computer-implemented method of claim 1, wherein the metadata for the base skill includes metadata for at least one of configuring, training, testing, or executing the base skill.

8. The computer-implemented method of claim 1, wherein the metadata for the base skill includes metadata for at least one of an intent, an entity, an utterance, a custom component, or a conversation flow of the base skill.

9. The computer-implemented method of claim 1, wherein the second JSON file includes metadata for a custom component in the extended skill.

10. The computer-implemented method of claim 1, wherein modifying the base skill to generate the extended skill includes modifying the base skill through a representational state transfer application programming interface (REST API).

11. A non-transitory computer-readable storage medium storing computer-executable instructions that, when executed by one or more processors of a computing system, causing the one or more processors to perform operations including:
obtaining, from a database storing metadata in JavaScript Object Notation (JSON) files for a plurality of skills, a first JSON file including metadata for a base skill;

receiving, via an application programming interface (API), a modification to the base skill to generate an extended skill, wherein the modification includes an alteration to existing metadata artifacts or resources of the base skill, and wherein the metadata artifacts or resources are a top-level skill definition, an intent, an entity, an utterance, a custom component, conversation flow, a resource bundle, or a combination thereof, associated with the base skill;

determining a difference between metadata for the extended skill and the metadata for the base skill based on the alteration to the metadata artifacts or resources of the base skill;

generating a second JSON file describing changes to be made to the metadata for the base skill to generate the metadata for the extended skill based on the difference between the metadata for the base skill and the metadata for the extended skill, wherein the second JSON file represents only the difference between the metadata for the base skill and the metadata for the extended skill;

storing, in the database, the second JSON file separately from the first JSON file;

modifying, using the first JSON file and the second JSON file, the metadata for the base skill by applying the changes described in the second JSON file to be made to the metadata for the base skill to generate the metadata for the extended skill; and implementing the extended skill based on implementation data for the base skill and the metadata generated for the extended skill.

12. The non-transitory computer-readable storage medium of claim 11, wherein the plurality of skills include two or more versions of the base skill.

13. The non-transitory computer-readable storage medium of claim 12, wherein the second JSON file is compatible with at least two versions of the base skill for extending the at least two versions of the base skill.

14. The non-transitory computer-readable storage medium of claim 12, wherein:
the second JSON file is incompatible with at least one version in the two or more versions of the base skill; and
the database includes a third JSON file that is compatible with the at least one version in the two or more versions of the base skill, wherein the second JSON file and the third JSON file have different version numbers.

15. A computer system comprising:
one or more processors; and
a non-transitory computer-readable storage medium storing computer-executable instructions that, when executed by the one or more processors, causing the one or more processors to perform operations including:
obtaining, from a database storing metadata in JavaScript Object Notation (JSON) files for a plurality of skills, a first JSON file including metadata for a base skill;

receiving, via an application programming interface (API), a modification to the base skill to generate an extended skill, wherein the modification includes an alteration to existing metadata artifacts or resources of the base skill, and wherein the metadata artifacts or resources are a top-level skill definition, an intent, an entity, an utterance, a custom component, conversation flow, a resource bundle, or a combination thereof, associated with the base skill;

determining a difference between metadata for the extended skill and the metadata for the base skill based on the alteration to the metadata artifacts or resources of the base skill;
generating a second JSON file describing changes to be made to the metadata for the base skill to generate the metadata for the extended skill based on the difference between the metadata for the base skill and the metadata for the extended skill, wherein the second JSON file represents only the difference between the metadata for the base skill and the metadata for the extended skill;
storing, in the database, the second JSON file separately from the first JSON file;
modifying, using the first JSON file and the second JSON file, the metadata for the base skill by applying the changes described in the second JSON file to be made to the metadata for the base skill to generate the metadata for the extended skill; and
implementing the extended skill based on implementation data for the base skill and the metadata generated for the extended skill.

16. The computer system of claim 15, wherein the plurality of skills include two or more versions of the base skill.

17. The computer system of claim 16, wherein the second JSON file is compatible with at least two versions of the base skill for extending the at least two versions of the base skill.

18. The computer system of claim 16, wherein:

the second JSON file is incompatible with at least one version in the two or more versions of the base skill; and the database includes a third JSON file that is compatible with the at least one version in the two or more versions of the base skill, wherein the second JSON file and the third JSON file have different version numbers.

* * * * *